(12) United States Patent
Ishige et al.

(10) Patent No.: US 7,616,232 B2
(45) Date of Patent: Nov. 10, 2009

(54) REMOTE SHOOTING SYSTEM AND CAMERA SYSTEM

(75) Inventors: Yoshiyuki Ishige, Asaka (JP); Mikio Watanabe, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 417 days.

(21) Appl. No.: 11/607,951

(22) Filed: Dec. 4, 2006

(65) Prior Publication Data

US 2007/0126883 A1 Jun. 7, 2007

(30) Foreign Application Priority Data

Dec. 2, 2005 (JP) ............................. 2005-349595
Feb. 7, 2006 (JP) ............................. 2006-029269

(51) Int. Cl.
*H04N 5/232* (2006.01)
(52) U.S. Cl. ............... 348/211.8; 348/208.1; 348/211.2
(58) Field of Classification Search ................. 348/158, 348/211.99, 211.2, 211.7, 211.8, 211.13, 348/211.14, 208.1
See application file for complete search history.

(56) References Cited

U.S. PATENT DOCUMENTS 5,438,362 A * 8/1995 Tabuchi .................... 348/211.2
7,379,664 B2 * 5/2008 Marcus .................. 348/211.11
2003/0071914 A1 * 4/2003 Wei et al. .................... 348/376
2005/0212909 A1 9/2005 Takehara et al.
2005/0212954 A1 * 9/2005 Senba et al. ................. 348/360
2007/0109324 A1 * 5/2007 Lin ............................ 345/671

FOREIGN PATENT DOCUMENTS

| JP | 61059976 A | * | 3/1986 |
| JP | 07-209700 A | | 8/1995 |
| JP | 07-294296 A | | 11/1995 |
| JP | 09-322021 A | | 12/1997 |
| JP | 11205535 A | * | 7/1999 |
| JP | 11-211474 A | | 8/1999 |
| JP | 2002-094867 A | | 3/2002 |
| JP | 2004-242262 A | | 8/2004 |
| JP | 2004242262 A | * | 8/2004 |

OTHER PUBLICATIONS

Notification of First Office Action issued by the Chinese Patent Office on Jul. 4, 2008, in corresponding CN Application No. 200610163697.X, English and Chinese, 15 pages.

* cited by examiner

*Primary Examiner*—Jason Whipkey
(74) *Attorney, Agent, or Firm*—Sughrue Mion, PLLC

(57) ABSTRACT

A remote shooting system includes an imaging unit, a main unit, and an imaging driving section. The main unit includes a position sensor that detects a vertical or horizontal position of the main unit. Based on an instruction signal transmitted from the main unit to the imaging driving section according to the position detected by the position sensor, the imaging driving section drives the imaging unit being attached to the imaging driving section about a rotation axis parallel with an optical axis of a shooting lens provided in the imaging unit.

6 Claims, 19 Drawing Sheets

REMOTE SHOOTING SYSTEM AND CAMERA SYSTEM

BACKGROUND OF THE INVENTION

1. Field of the Invention

The present invention relates to a remote shooting system that performs remote shooting, and to a camera system that includes: a camera head which is provided with an imaging device and an image-taking optical system; and a camera main unit to which the camera head is detachably attached and which receives and processes image signals transmitted from the camera head.

2. Description of the Related Art

Conventionally, there are known remote shooting systems each having: an image-taking section that includes a shooting lens and an imaging device and generates image signals representing a subject image; and an operation section for remotely operating the shooting section. In such a remote shooting system, vertical shooting is carried out such that a user gives an instruction for rotating the remote shooting section 90 degrees about a pivot parallel with an optical axis, by operating an operation member included in the operation section.

There is also known a remote shooting system provided with an image-taking apparatus and a host controller for controlling the image-taking apparatus via a communication path. For example, Japanese Patent Application Publication No. 2002-94867 discloses this type of system and proposes a technique for changing an icon, which indicates the image-taking apparatus displayed on a display of the host controller, in order to guide user operation according to a shooting mode. This technique allows a user to know a rotation direction that the user is expected to use while holding the image-taking apparatus, by looking at the displayed icon in order to carry out vertical shooting.

Meanwhile, there is proposed a camera system that includes: a camera main unit provided with an image-taking optical system and an imaging device; and a camera head detachably attachable to the camera main unit, and that intends to carry out shooting while maximizing the utilization of a shooting capability of the camera head (see Japanese Patent Application Publication No. 2002-322021 for example). In this type of camera system, it is convenient if shooting can be carried out regardless of whether the camera head is attached to the camera main unit or not, i.e. it is convenient if shooting can be carried out through remote operation even when the camera head is separated from the camera main unit. Suppose shooting can be carried out through remote operation in this way, it is further convenient if there is provided a panhead for freely adjusting the position of the camera head. In this case, it is possible to carry out not only shooting with the camera head being attached to the camera main unit, but also shooting with the camera head being attached to the panhead, depending on shooting environment.

In order to carry out shooting operation with the camera head being detached from the camera main unit in a manner similar to the shooting operation with the camera head being attached to the camera main unit, it is desirable to enhance the capability of the panhead so that the panhead can be freely movable according to any of operations such as panning, tilting and 90-degree rotation of the body for vertical/horizontal shooting (these operations may be hereinafter referred to as panning operation, tilting operation, and rolling operation or rolling, respectively).

In this regard, there have been devised and proposed various types of panheads so far (see Japanese Patent Application Publications No. 7-294296, No. 7-209700 and No. 11-211474 for example). Techniques disclosed in these documents are used to adjust the position of an image-taking apparatus according to remote operation. These techniques may be adapted to a panhead used to attach the camera head so that the camera head can be freely moved according to any of operations such as panning, tilting and rolling.

However, most of conventional systems including Japanese Patent Application Publications No. 7-294296, No. 7-209700 and No. 11-211474 are such a system that a user can move a camera head by operating an operation member or a user can cause a lens to face in the same direction as eyeglasses, which are worn by the user and serve as a finder, faces. Therefore, it is unlikely that these systems are easy to use when a user carries out panning, tilting or rolling.

Meanwhile, recently, the demand for acceleration sensors, angular-velocity sensors, and magnetic direction sensor has increased along with the spread of navigation systems, and thus these sensors have become inexpensive enough to be mounted on digital cameras. Japanese Patent Application Publications No. 9-322021, No. 7-294296, No. 7-209700 and No. 11-211474 are all employ such a sensor. When an acceleration sensor is employed, it is possible to detect the position or the like of a camera head or a camera main unit. Also, when an acceleration sensor and a magnetic direction sensor are both employed, it is possible to detect the positional changing status of a camera head or a camera main unit when they rotate.

As described above, in conventional remote shooting systems, vertical shooting requires operation through an operation member provided in an operation section or operation through a set-up means provided in a host controller. However, when using an ordinary camera, a user merely needs to rotate a camera main unit to a vertical position so as to carry out vertical shooting. Therefore, it is difficult for a user to carry out vertical shooting smoothly and swiftly in the conventional remote shooting systems, because the user needs to go through the above-described time-consuming operation.

SUMMARY OF THE INVENTION

The present invention has been made in view of the above circumstances, and provides a remote shooting system excellent in operability, and also provides a camera system that allows a user to carry out shooting operation with a camera head being detached from the camera main unit as if carrying out shooting operation with the camera head being attached to the camera main unit.

A first remote shooting system of the invention is a remote shooting system including:

an imaging unit which includes a shooting lens and an imaging device to generate image signals representing a subject;

a main unit to which the imaging unit is detachably attachable and which receives and records image signals transmitted from the imaging unit; and an imaging driving section to which the imaging unit being detached from the main unit is detachably attachable and which controls a position of the imaging unit, wherein the main unit includes a detection section that detects either of a vertical position and a horizontal position of the main unit, and a transmission section that wirelessly transmits an instruction signal according to the position of the main unit detected by the detection section, and wherein the imaging driving section includes a receiving section that receives an instruction signal wirelessly transmitted from the main unit, and a rotation driving section that rotates, based on the instruction signal received by the receiving section, the imaging unit being attached to the imaging driving section about a rotation axis parallel with an optical axis of the shooting lens of the imaging unit.

In the first remote shooting system, the imaging driving section receives an instruction signal wirelessly transmitted from the main unit according to a vertical or horizontal position of the main unit, and rotates the imaging unit being attached to the imaging driving section about the rotation axis parallel with the optical axis of the shooting lens of the imaging unit, based on the received instruction signal. Therefore, the first remote shooting system makes it possible to readily carry out remote vertical shooting only by moving the main unit in a vertical shooting direction, as in the case of an ordinary shooting apparatus whose main unit is attached to its imaging unit. Accordingly, it is possible to provide a remote shooting system excellent in operability.

In the first remote shooting system according to the invention, preferably, the imaging driving section further includes a transmission section that wirelessly receives image signals from the imaging unit being attached to the imaging driving section and wirelessly transmits the received image signals to the main unit, and the main unit further includes a receiving section that receives image signals wirelessly transmitted from the imaging driving section.

This additional feature makes it possible to perform transmission and receipt of image signals between the main unit and the imaging driving section.

A second remote shooting system of the invention is a remote shooting system including:

an imaging section which includes an imaging unit having: a shooting lens; and an imaging device to generate image signals representing a subject; and an operation section which includes a detection section that detects either of a vertical position and a horizontal position of the operation section, wherein the operation section further includes a transmission section that wirelessly transmits an instruction signal according to the position detected by the detection section, and wherein the imaging section further includes a receiving section that receives an instruction signal wirelessly transmitted from the operation section, and a rotation driving section that rotates, based on the instruction signal received by the receiving section, the imaging unit about a rotation axis parallel with an optical axis of the shooting lens.

In the second remote shooting system, the imaging section receives an instruction signal transmitted from the operation section according to a vertical or horizontal position of the operation section, and the imaging unit is rotated about the rotation axis parallel with the optical axis of the shooting lens, based on the received instruction signal. Therefore, the second remote shooting system makes it possible to readily carry out remote vertical shooting, only by moving the operation section in a vertical shooting direction so as to perform vertical shooting. Accordingly, it is possible to provide a remote shooting system excellent in operability.

A first camera system of the invention is a camera system including:

a camera head which includes a shooting lens and an imaging device;

a camera main unit to which the camera head is detachably attachable and which receives and processes image signals transmitted from the camera head; and a head adaptor which includes a panhead section to which the camera head being detached from the camera main unit is detachably attachable instead of being attached to the camera main unit, and a head receiving section that receives an operation signal from the camera main unit, wherein the camera main unit includes:

a position detection section that detects a position of the camera main unit; and a main-unit transmission section that transmits an operation signal according to the position detected by the position detection section to the head adaptor, and wherein the head adaptor further includes a panhead control section that controls a position of the camera head being attached to the panhead section by driving the panhead section based on the operation signal received by the head receiving section.

In the first camera system, even when the camera head and the camera main unit are separated from each other, the main-unit transmission section transmits an operation signal for determining a composition to the head adaptor according to the position of the camera main unit detected by the position detection section, and the head receiving section receives the operation signal transmitted from the main-unit transmission section. Accordingly, under the control of the panhead control section, the position of the camera head is adjusted to a position that determines the composition represented by the operation signal.

This camera system enables a user to adjust the position of the camera head through operation as if operating the main unit to which the camera head is attached, instead of operating an operation member in an ordinary camera system.

Accordingly, there is realized the camera system that performs shooting even when the camera head and the camera main unit are separated from each other, in a manner similar to shooting performed in the state when the camera head is attached to the camera main unit.

In the first camera system, preferably, the camera main unit further includes a selector switch that switches a way of changing the position of the camera head being attached to the panhead section, between a mode for changing the position of the camera head according to operation through an operation member provided in the camera main unit and a mode for changing the position of the camera head according to the position of the camera main unit, the main-unit transmission section transmits switching information related to a status of the selector switch in addition to the operation signal to the head adaptor, and the panhead control section drives the panhead section based on the operation signal as well as the switching information.

When shooting operation such as panning, tilting and rolling is not necessary, it may be easier to operate the system with the operation member as in an ordinary camera system.

For this reason, the selector switch is provided to switch between either of the two modes in the first camera system. Because the head adaptor also receives the switching information as described above, the panhead control section of the head adaptor controls the panhead section according to the switching information, so as to adjust the position of the camera head either according to operation through the operation member or according to the position of the camera main unit.

When the selector switch is thus provided, it is possible to carry out shooting by operating the operation member as in an ordinary camera system, and also to carry out shooting while changing the position of the camera main unit through panning, tilting or rolling operation. As a result, the camera system that is made further user-friendly can be provided.

In the first camera system, the position detection section may include a three-axis acceleration sensor, in order to drive the panhead section according to the detected position of the camera main unit when the camera head and the camera main unit are separated from each other. The three-axis acceleration sensor serves as the position detection section, and a signal representing a position based on a result of detection by the three-axis acceleration sensor may be transmitted to the camera head.

In the first camera system, the position detection section may further include, in addition to the three-axis acceleration sensor, either one of a magnetic direction sensor and an angular-velocity sensor. This additional feature makes it possible to detect an angular change that occurs during rotation in the rotation direction up to a target position. Therefore, by raising the level of responsivity of the panhead section, it is possible for a user to perform shooting through panning, tilting or rolling, as if carrying out shooting with the camera head being attached to the camera main unit.

As mentioned above, the three-axis acceleration sensor, magnetic direction sensor and angular-velocity sensor have become less expensive due to an increase in demand. Therefore, employing the three-axis acceleration sensor and additionally the magnetic direction sensor or the angular-velocity sensor in the camera system does not increase the cost and thus, it is possible to provide the camera system as an inexpensive product.

Incidentally, a main-unit adaptor similar to the head adaptor may be added to the camera system, and the functions of the camera main unit of the first camera system may be incorporated into the main-unit adaptor.

Such a camera system is a second camera system according to the invention

The second camera system is a camera system including:

a camera head which includes a shooting lens and an imaging device;

a camera main unit to which the camera head is detachably attachable and which receives and processes image signals transmitted from the camera head;

a head adaptor which includes a panhead section to which the camera head being detached from the camera main unit is detachably attachable instead of being attached to the camera main unit, and a head receiving section that receives an operation signal from the camera main unit; and a main-unit adaptor which is detachably attachable to the camera main unit being detached from the camera head instead of being attached to the camera head, wherein the main-unit adaptor includes:

a position detection section that detects a position of the main-unit adaptor; and a main-unit transmission section that transmits an operation signal according to the position detected by the position detection section to the head adaptor, and wherein the head adaptor further includes a panhead control section that controls a position of the camera head being attached to the panhead section by driving the panhead section based on the operation signal received by the head receiving section.

In this second camera system, preferably, the main-unit adaptor further includes a selector switch that switches a way of changing the position of the camera head being attached to the panhead section, between a mode for changing the position of the camera head according to operation through an operation member provided in the camera main unit and a mode for changing the position of the camera head according to the position of the camera main unit, the main-unit transmission section transmits switching information related to a status of the selector switch in addition to the operation signal to the head adaptor, and the panhead control section drives the panhead section based on the operation signal as well as the switching information.

Further, in the second camera system, the position detection section may include a three-axis acceleration sensor. In this case, the position detection section may further include, in addition to the three-axis acceleration sensor, either one of a magnetic direction sensor and an angular-velocity sensor.

According to the invention, it is possible to provide remote shooting systems excellent in operability, and also provides camera systems that allow a user to carry out shooting operation with a camera head being detached from the camera main unit as if carrying out shooting operation with the camera head being attached to the camera main unit.

DETAILED DESCRIPTION OF THE INVENTION

Embodiments of the present invention will be described with reference to the drawings.

Figure 1:
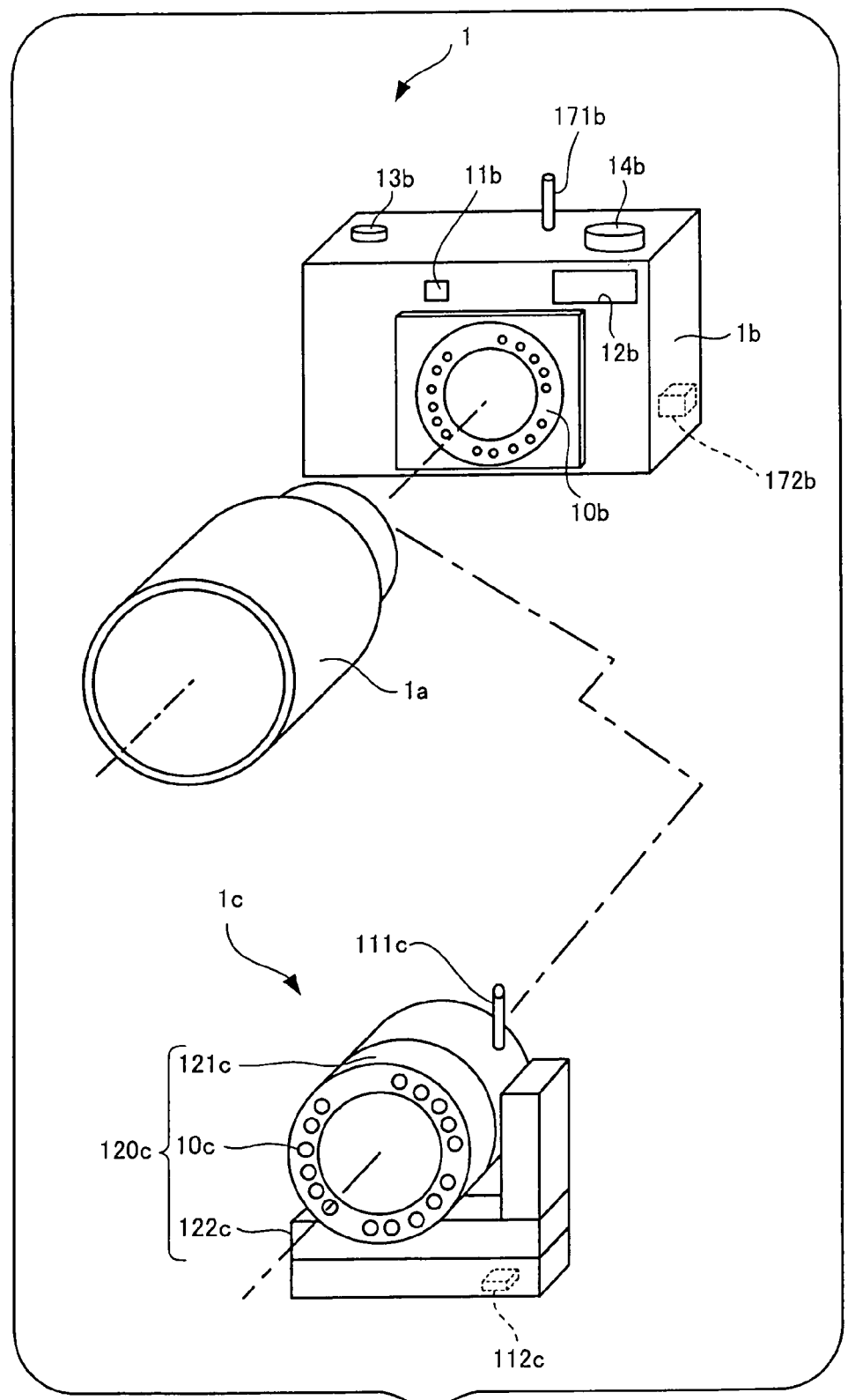
FIG. 1 is a diagram showing an embodiment of the first remote shooting system according to the invention.

FIG. 1 is a diagram showing an embodiment of the first remote shooting system according to the invention.

FIG. 1 illustrates: a remote shooting system 1 according to the embodiment of the first remote shooting system of the invention; an imaging unit 1a; a main unit 1b; and a imaging driving section 1c included in the remote shooting system 1.

The imaging unit 1a includes a shooting lens and an imaging device, which will be described later, and generates image signals representing a subject image.

To the main unit 1b, the imaging unit 1a is detachably attachable. When the imaging unit 1a is attached to the main unit 1b, the main unit 1b records image signals upon receipt of the signals from the imaging unit 1a. Disposed at the center of the main unit 1b is a mount section 10b provided with multiple mount contacts. The imaging unit 1a also has a similar mount section. On the top face of the main unit 1b, a release button 13b, a mode dial 14b and a wireless communication antenna 171b are disposed. Further, on the front face of the main unit 1b, an AWB sensor 11b and a flash window 12b are disposed. The mode dial 14b is used to select any of a sill-image-shooting mode, a movie-shooting mode, a normal-shooting mode and a remote-shooting mode and the like.

The main unit 1b is also provided with a position sensor 172b that detects a vertical or horizontal position of the main unit 1b (corresponding to an example of the "detection section" of the invention). An instruction signal output by the position sensor 172b according to the detected vertical or horizontal position of the main unit 1b is wirelessly transmitted from a wireless I/F section 151b shown in FIG. 2, which will be described later, via the antenna 171b. The wireless I/F section 151b also serves as a receiver that receives image signals wirelessly transmitted from the imaging driving section 1c.

The position sensor 172b is made of mercury or weight-type sensor, and detects a 90-degree rotation, but the sensor 172b may detect a mid-angle by employing a MEMS sensor or the like. Wireless communication in the embodiment may be performed through any of wireless LAN conforming to IEEE 802.11 and the like, short-range communications such as wireless USB and Bluetooth, and long-range network communications such as CDMA and the like.

To the imaging driving section 1c, the imaging unit 1a removed from the main unit 1b is detachably attached. The imaging driving section 1c controls the position of the imaging unit 1a when the imaging unit 1a is attached thereto. The imaging driving section 1c has a wireless I/F section 112c serving as a receiver that receives an instruction signal wirelessly transmitted from the main unit 1b via an antenna 111c. The wireless I/F section 112c also serves as a transmitter that wirelessly transmits, to the main unit 1b, image signals received from the imaging unit 1a being attached to the imaging driving section 1c.

The imaging driving section 1c also has a rotation driving section 120c that causes, based on an instruction signal received with the wireless I/F section 112c, the imaging unit 1a being attached to the imaging driving section 1c to rotate about a rotation axis provided in parallel with the optical axis of the shooting lens of the imaging unit 1a. The rotation driving section 120c has: a mount section 10c provided with multiple mount contacts; an ultrasonic motor 121c; and an enclosure 122c.

In order to carry out normal shooting, the imaging unit 1a is mechanically attached to the main unit 1b along a chain line shown in FIG. 1 while the mount contacts of the imaging unit 1a are respectively aligned with those of the main unit 1b. Accordingly, the multiple mount contacts of the unit 1a are connected to the corresponding mount contacts of the unit 1b and thus, the imaging unit 1a and the main unit 1b become electrically connected to each other.

Figure 2:
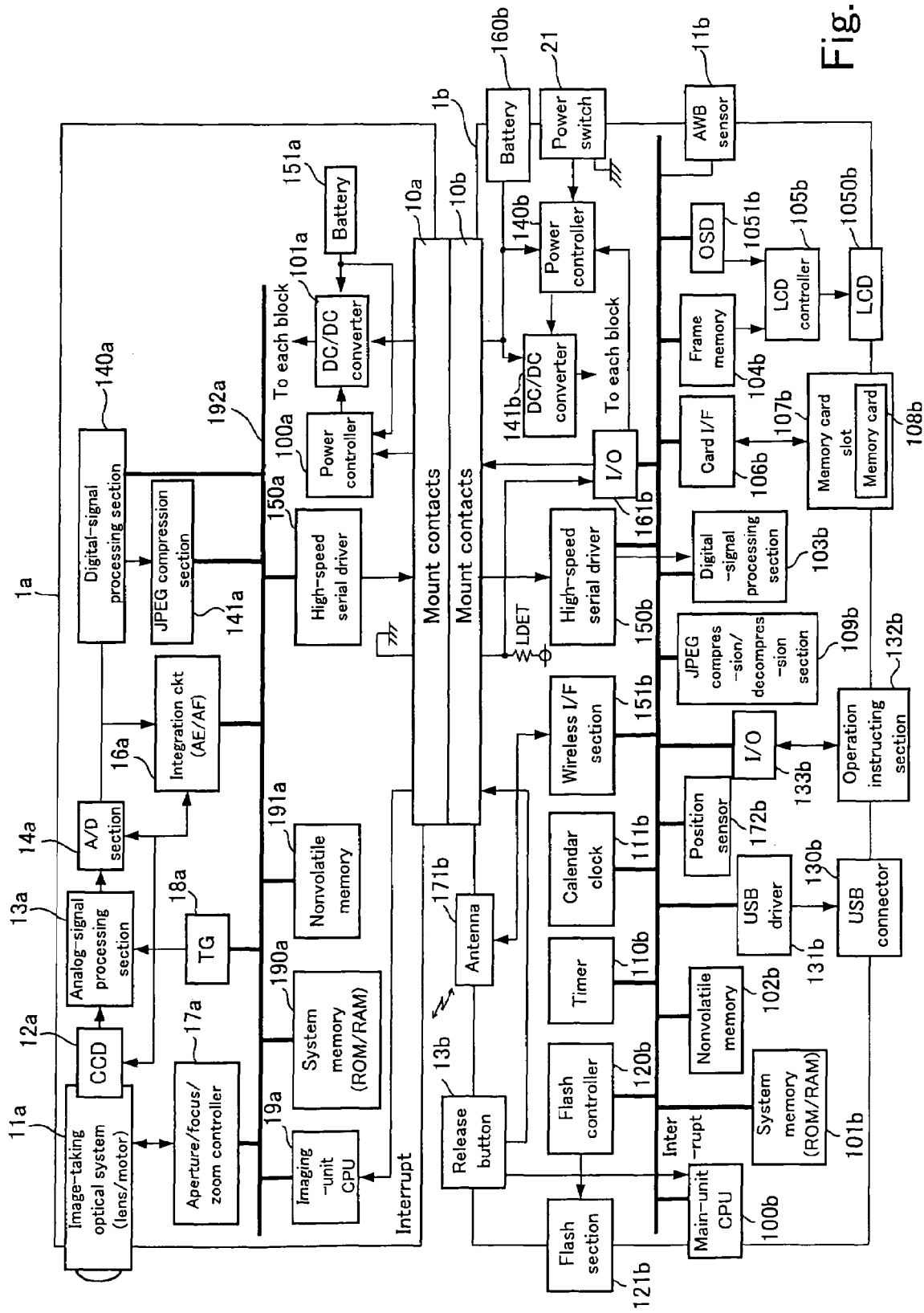
FIG. 2 is a block diagram showing an electric system configuration in the state when an imaging unit is attached to a main unit so as to perform normal shooting.

In order to carry out remote shooting, the imaging unit 1a is mechanically attached to the imaging driving section 1c along the chain line shown in FIG. 1 while the mount contacts of the imaging unit 1a are respectively aligned with those of the imaging driving section 1c. With reference to FIG. 2, the operation for the normal shooting will be described first.

FIG. 2 is a block diagram showing an electric system configuration in the state when the imaging unit 1a is attached to the main unit 1b so as to perform normal shooting.

The upper part of FIG. 2 shows a configuration of the imaging unit 1a, while the lower part of FIG. 2 shows a configuration of the main unit 1b. First, the configuration of the imaging unit 1a will be described.

The imaging unit 1a has an image-taking optical system 11a and an imaging device (hereinafter referred to as "CCD" because a CCD solid-state imaging device is employed here) 12a. A shooting lens, a diaphragm and the like are disposed in the image-taking optical system 11a. The CCD 12a generates image data representing a subject image formed on the CCD 12a through the image-taking optical system 11a. Image data generated by the CCD 12a is output to an analog-signal processing section 13a where the image data is subjected to processing such as noise reduction. Subsequently, the image data is sent to an A/D section 14a that applies analog-digital signal conversion to the image data. The digital image signals are then supplied to a digital-signal processing section 140a where the received signals are subjected to predetermined digital signal processing. The signals thus processed are directly transmitted to a high-speed serial driver 150a or to a JPEG compression section 141a via a data bus 192a. The image signals compressed in JPEG format by the JPEG compression section 141a are then transmitted to the high-speed serial driver 150a.

Image signals to be supplied to the main unit 1b through the high-speed serial driver 150a include three types of signals: image signals for a through (live) image, for a still image, and for a moving image. The image signals for a through image (hereinafter referred to as "through-image signal") are signals used to display a through image of a subject captured by the shooting lens of the image-taking optical system 11a on an LCD panel (not shown), when the still-image shooting mode or the movie-shooting mode is selected through the mode dial 14b. The image signals for a still image (hereinafter referred to as "still-image signal") are signals representing a still image obtained upon a press of the release button 13b when the sill-image-shooting mode is selected. The image signals for a moving image are signals representing a moving image obtained upon a press of the release button 13b when the movie-shooting mode is selected. Image signals of any one of these three types are transmitted from the imaging unit 1a to the main unit 1b through the high-speed serial driver 150a, in response to a request issued by the main unit 1b.

Meanwhile, the image signals converted into digital form by the A/D section 14a are also supplied to an integration circuit 16a provided in a subsequent stage. The integration circuit 16a serves as an element to activate both AF function and AE function (hereinafter referred to as "AF" and "AE," respectively). The integration circuit 16a measures subject brightness to activate the AE function and also measures a subject distance to activate the AF function. The subject brightness and the subject distance measured by the integration circuit 16a are supplied to an aperture/focus/zoom controller 17a via the data bus 192a, so that the aperture/focus/zoom controller 17a adjusts the aperture of the diaphragm in the image-taking optical system 11a and the position of a focus lens in the image-taking optical system 11a based on the received measurement results. This configuration makes it possible to activate the AF and AE whenever the lens in the image-taking optical system 11a of the imaging unit 1a is directed to a different subject. Accordingly, the CCD 12a generates and outputs image data representing a subject image brought into focus as a result of prompt focus and brightness adjustments. The CCD 12a, the analog-signal processing section 13a, the A/D section 14a and the integration circuit 16a operate in synchronism with timing signals generated by a timing generator (TG) 18a.

A ROM of a system memory 190a stores an initialization program, manufacturer's name, model name, version information etc. Meanwhile, a RAM of the system memory 190a has a working area to be used during program execution.

A nonvolatile memory 191a stores a program for implementing functions unique to the imaging unit 1a.

An imaging-unit CPU 19a transfers the program stored in the nonvolatile memory 191a to the RAM of the system memory 190a according to procedures described in the initialization program stored in the ROM of the system memory 190a, and controls the entire imaging unit 1a according to the transferred program.

The imaging unit 1a also includes: a battery 151a; a DC/DC converter 101a that converts voltage from the battery 151a into DC voltage of a predetermined level and supplies the DC voltage to each block; and a power controller 100a that controls the DC/DC converter 101a. This concludes the description of the configuration of the imaging unit 1a. Next, the configuration of the main unit 1b will be described.

The entire operation of the main unit 1b is controlled by a main-unit CPU 100b, as in the case of the imaging unit 1a. A ROM of a system memory 101b stores an initialization program, manufacturer's name, model name, version information etc. Meanwhile, a RAM of the system memory 101b has a working area to be used during program execution.

A nonvolatile memory 102b stores adjustment data unique to the main unit 1b and a program for implementing functions unique to the main unit 1b.

The main-unit CPU 100b transfers the program stored in the nonvolatile memory 102b to the RAM of the system memory 101b according to procedures described in the initialization program stored in the ROM of the system memory 101b, and controls the entire main unit 1b according to the transferred program.

In the present embodiment, image signals of any of the three types, i.e. through-image signal, still-image signal and moving-image signal as described above, are transferred from the imaging unit 1a to the main unit 1b via a high-speed serial driver 150b. For example, when JPEG-compressed through-image signals are received, the received image signals are decompressed by a JPEG compression/decompression section 109b of the main unit 1b, and then supplied to a digital-signal processing section 103b where the signals are converted into through-image signals used for display. The through-image signals used for display are then stored in a frame memory 104b. A LCD controller 105b reads out the through-image signals stored in the frame memory 104b therefrom and displays a through image based on the read-out signals on a LCD panel of a LCD 1050b. The LCD controller 105b is also supplied with information from an on-screen display (OSD) 1051b, and displays a selection menu together with a through image on the LCD panel based on the supplied information.

Besides the above-described elements for processing image signals, the main unit 1b has a timer 110b and a calendar clock 111b for displaying time and date information on the LCD panel via the OSD 1051b.

The main unit 1b also includes a memory card slot 107b into which a memory card 108b is removably inserted and a card I/F 106b that accesses the inserted memory card 108b. The memory card 108b stores data representing still images and moving images.

The main unit 1b further includes an operation instructing section 132b that is composed of the release button 13b, the mode dial 14b and the like, and provides an operation instruction to the main-unit CPU 100b. An operation instruction is supplied from the operation instructing section 132b to the main-unit CPU 100b via an I/O 133b. The main-unit CPU 100b performs processing according to the received operation instruction. However, the release button 13b is directly connected to interruption terminals of both of the main-unit CPU 100b and the imaging-unit CPU 19a and thus, the both CPUs 19a and 100b can be interrupted by a press of the release button 13b to activate a still-image processing program or a moving-image processing program.

The main unit 1b also includes a battery 160b that supplies power to each block of the main unit 1b via a DC/DC converter 141b and also supplies power to each block of the shooting unit 1a via the DC/DC converter 101a. These DC/DC converters 101a and 141b are controlled by the power controller 10a and a power controller 140b provided in the imaging unit 1a and the main unit 1b, respectively. In response to the power switch 21 being slid, a power-on instruction is given to the power controller 140b of the main unit 1b. Then, the power controller 140b gives an output instruction to the DC/DC converter 141b of the main unit 1b and also to the power controller 10a of the imaging unit 1a via an I/O 161b, so that power is supplied from the DC/DC converter 101a to each block. To the I/O 161b, a signal LDET of "L" level, which indicates that the imaging unit 1a is attached to the main unit 1b, is input.

The main unit 1b also has a USB driver 131b and a USB connector 130b used for connection to an external device such as a personal computer.

The main unit 1b also includes the position sensor 172b and the antenna 171b that are described above as features of the present embodiment, and the wireless I/F section 151b. The wireless I/F section 151b is used in remote shooting as will be described later, and serves as a transmitter that wirelessly transmits, through the antenna 171, an instruction signal according to a vertical or horizontal position of the main unit 1b detected by the position sensor 172b. The wireless I/F section 151b also serves as a receiver that receives image signals wirelessly transmitted from the imaging driving section 1c. Next, remote shooting will be described.

Figure 3:
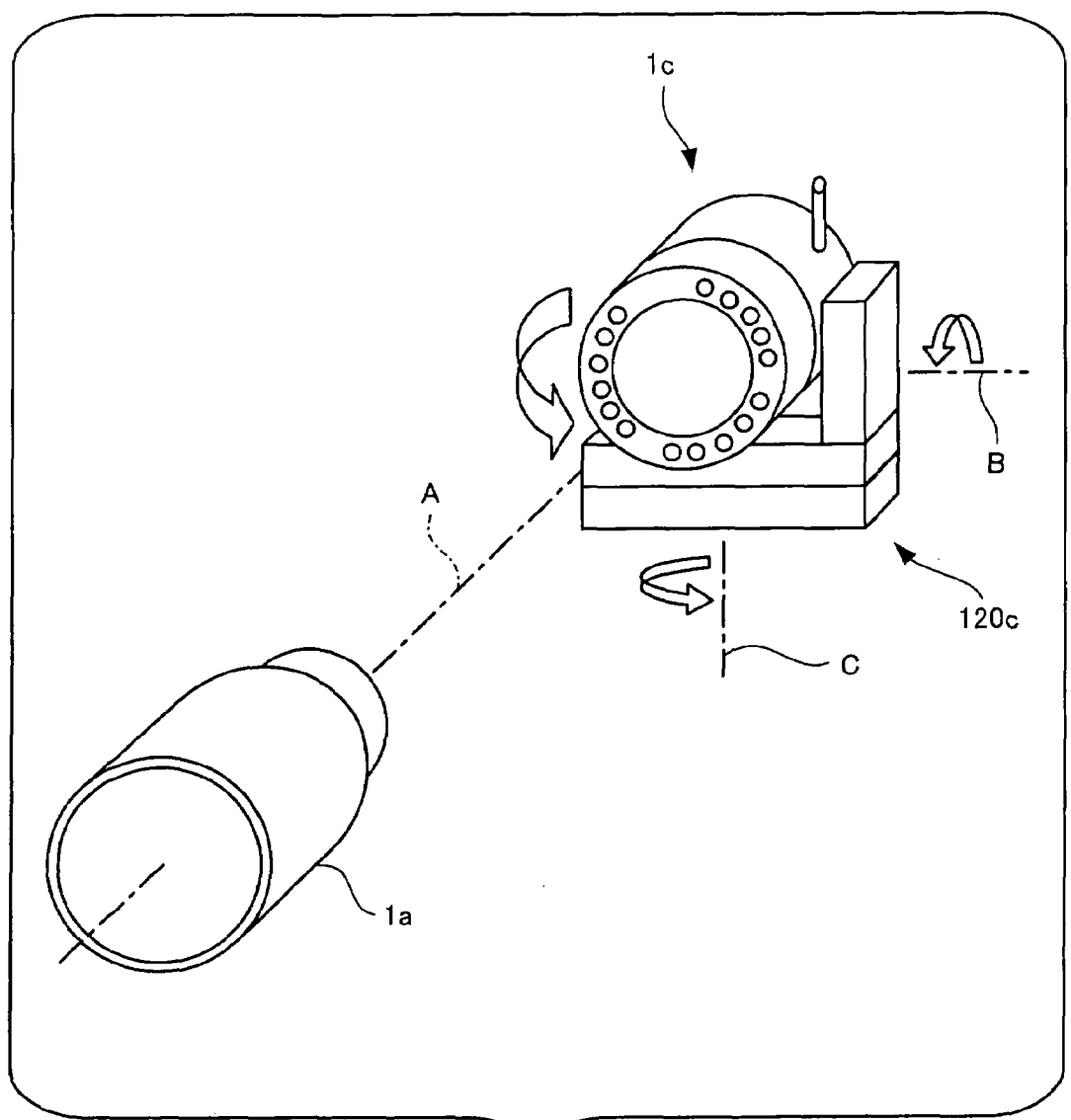
FIG. 3 is a diagram showing how the imaging unit is attached to an imaging driving section.

FIG. 3 is a diagram showing how the imaging unit 1a is attached to the imaging driving section 1c.

In order to perform remote shooting, as shown in FIG. 3, the imaging unit 1a is mechanically attached to the imaging driving section 1c along a chain line (A) shown in FIG. 3 while the mount contacts of the imaging unit 1a are respectively aligned with those of the imaging driving section 1c. Accordingly, the multiple mount contacts of the unit 1a are connected to the corresponding mount contacts of the unit 1c and thus, the imaging unit 1a and the imaging driving section 1c become electrically connected to each other.

Here, the rotation driving section 120c of the imaging driving section 1c rotates the imaging unit 1a being attached to the imaging driving section 1c, about a rotation axis A parallel with an optical axis of the shooting lens of the imaging unit 1a. The rotation driving section 120c also rotates the imaging unit 1a about a rotation axis B in a vertical direction and about a rotation axis C in a horizontal direction.

Figure 4:
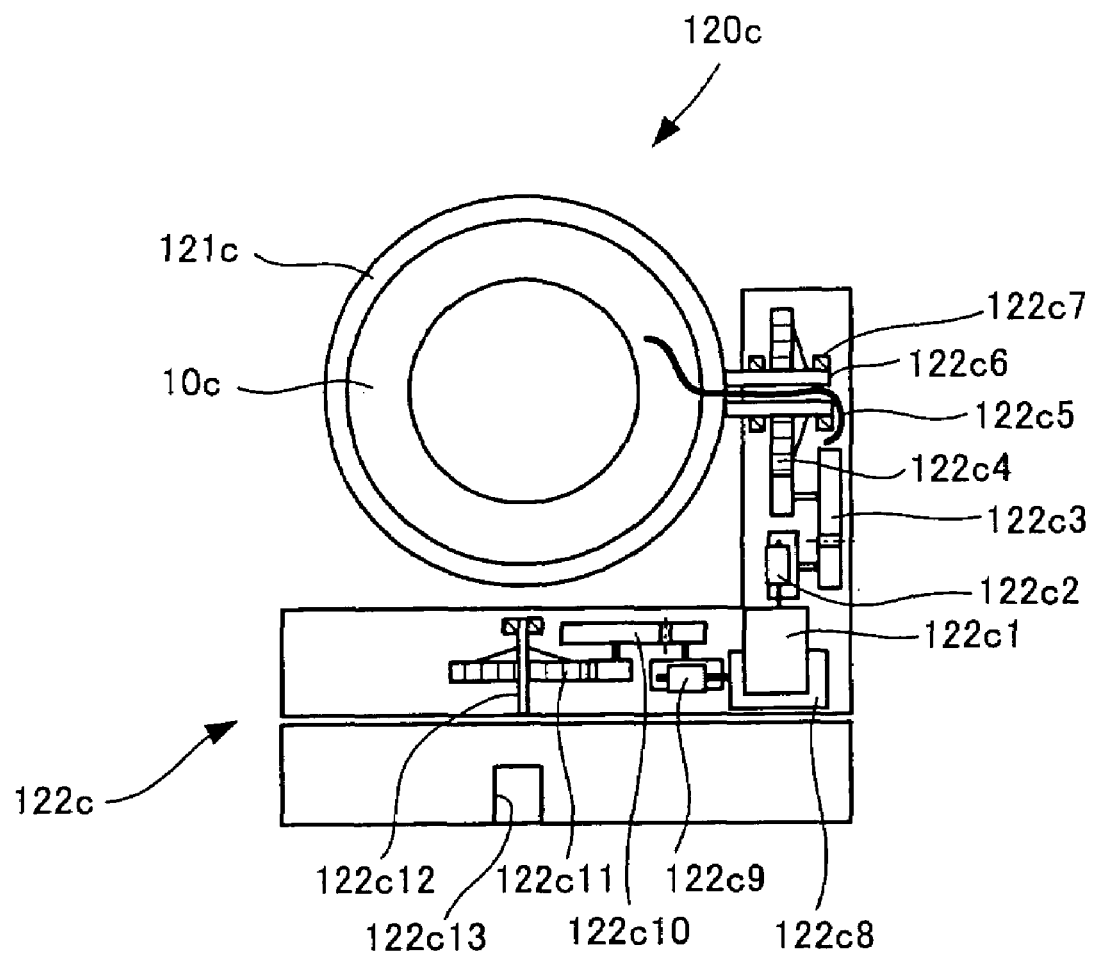
FIG. 4 is a diagram showing a structure of a rotation driving section of the imaging driving section.

FIG. 4 is a diagram showing a configuration of the rotation driving section 120c of the imaging driving section 1c.

The rotation driving section 120c shown in FIG. 4 is provided with the ultrasonic motor 121c, the mount section 10c and the enclosure 122c.

The enclosure 122c is provided with a motor 122c1 used for vertical rotation, a worm gear 122c2 whose spindle is supported by the motor 122c1, a worm wheel 122c3 that transmits a rotation driving force from the worm gear 122c2, a skidding wheel 122c4, a wire 122c4 for controlling the ultrasonic motor 121c, a rotation axis 122c6 in an aerial structure, and a bearing 122c7.

The enclosure 122c further has a motor 122c8 used for horizontal rotation, a worm gear 122c9 whose spindle is supported by the motor 122c8, a worm wheel 122c10 that transmits a rotation driving force from the worm gear 122c9, a skidding wheel 122c11, a rotation axis 122c12, and a screw hole 122c13 used to attach the rotation driving section 120c to a tripod.

The ultrasonic motor 121c creates mechanical vibrations by means of a piezoelectric element (not shown) and obtains rotation force based on the mechanical vibrations, thereby rotating the imaging unit 1a being attached to the imaging driving section 1c about the rotation axis parallel with the optical axis of the shooting lens of the imaging unit 1a.

It is also possible to rotate the imaging unit 1a about the rotation axis B for rotation in the vertical direction and the rotation axis C for rotation in the horizontal direction shown in FIG. 3, by operating a cross key that will be described later and disposed on the back face of the main unit 1b to drive the motor 122c1 used for vertical rotation and the motor 122c8 used for horizontal rotation, respectively. In order to prevent a user-instructed direction from changing with the rotation of the main unit 1b, the function of the cross key may be changed according to the position of the main unit 1b.

Figure 5:
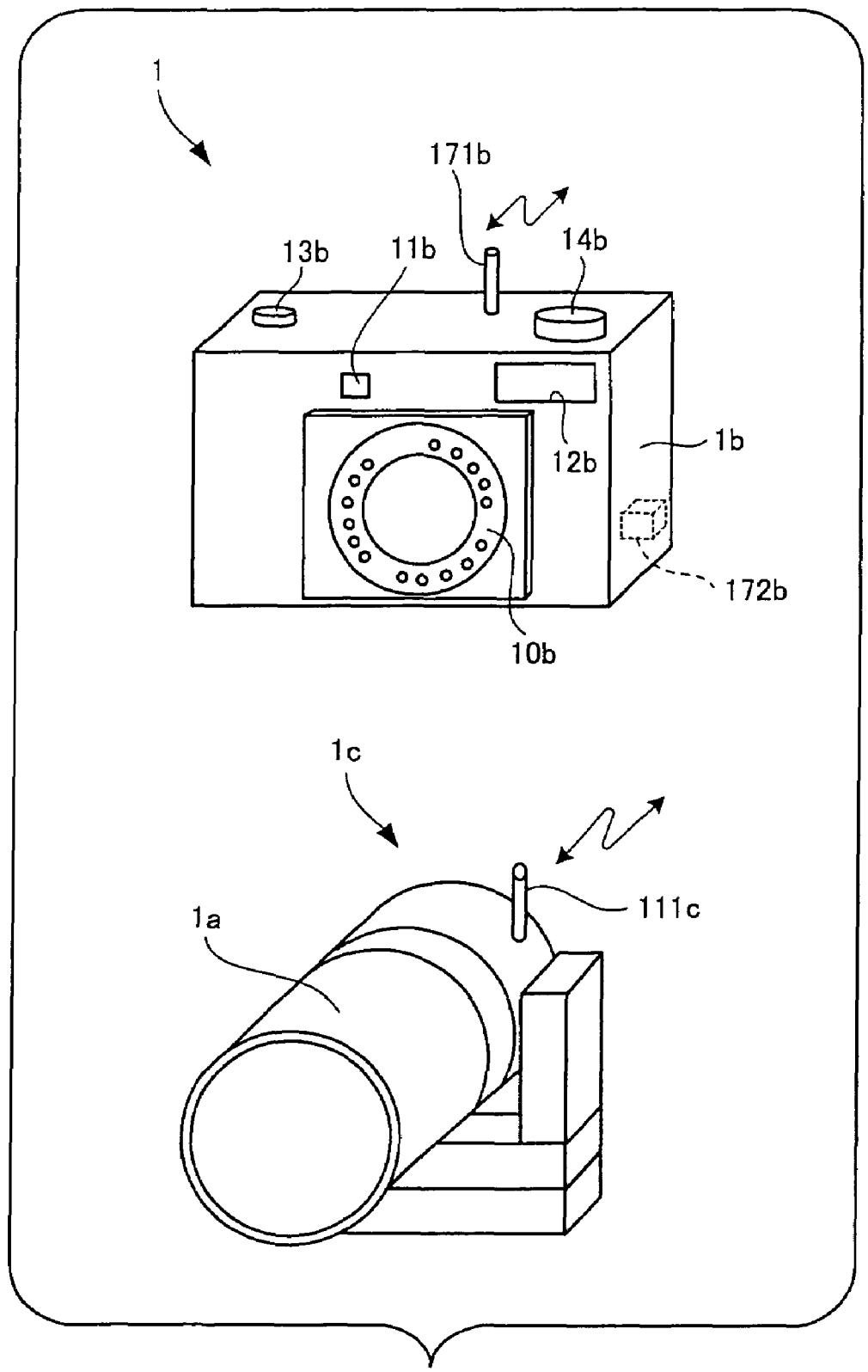
FIG. 5 is a diagram showing a state when remote shooting is performed between the main unit and the imaging driving section to which the imaging unit is attached.

FIG. 5 is a diagram showing a state when remote shooting is performed between the main unit 1b and the imaging driving section 1c to which the imaging unit 1a is attached.

A shown in FIG. 5, the imaging unit 1a is attached to the imaging driving section 1c in order to perform remote shooting. First, the operation performed during remote shooting will be described with reference to FIG. 6.

Figure 6:
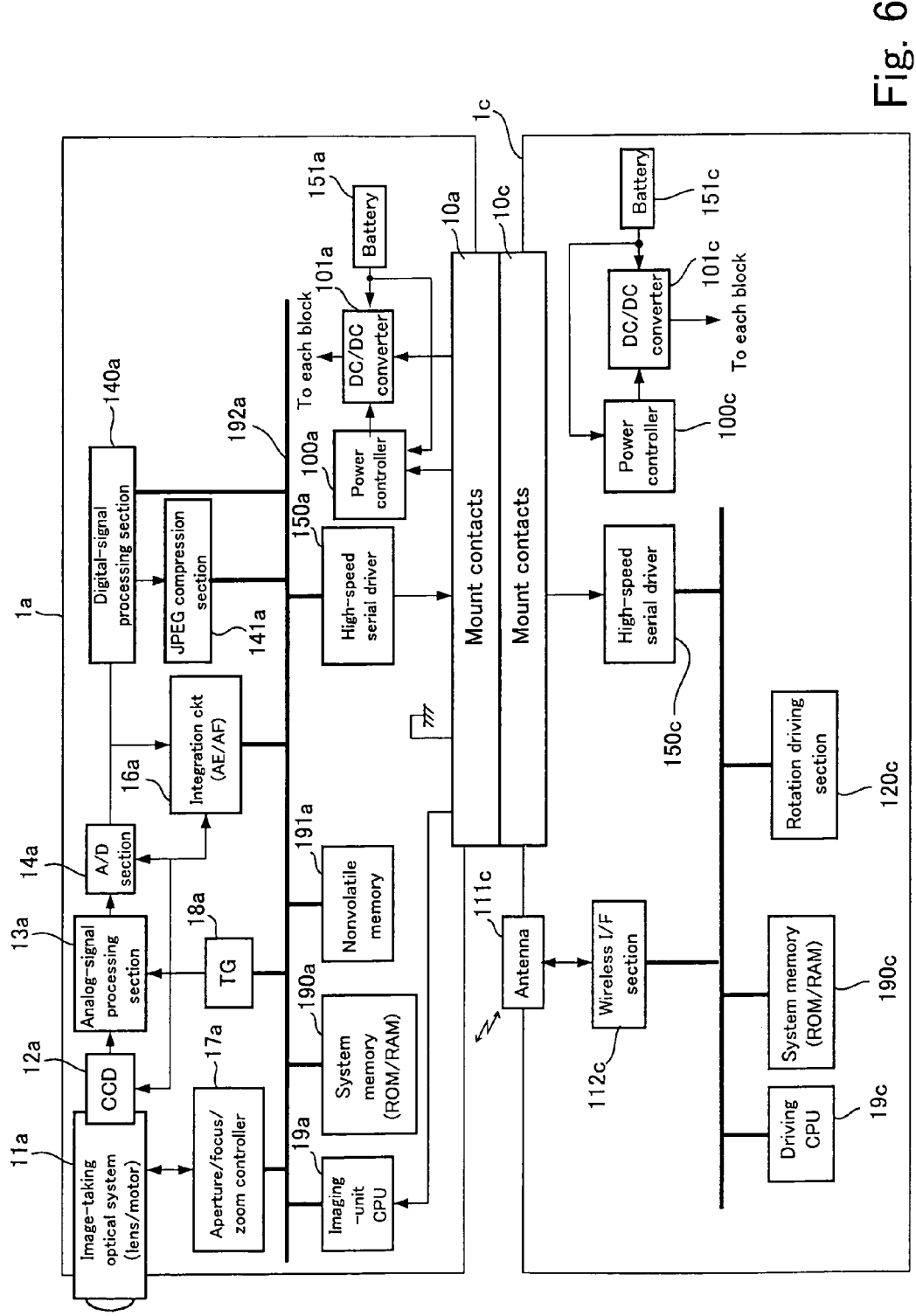
FIG. 6 is a block diagram showing an electric system configuration in the state when the imaging unit is attached to the imaging driving section so as to perform remote shooting.

FIG. 6 is a block diagram showing an electric system configuration in the state when the imaging unit 1a is attached to the imaging driving section 1c so as to perform remote shooting.

The upper part of FIG. 6 shows a configuration of the imaging unit 1a, while the lower part of FIG. 6 shows a configuration of the imaging driving section 1c. The configuration of the imaging unit 1a is similar to that shown in FIG. 2 and thus will not be described. The following description will focus on the configuration of the imaging driving section 1c.

The imaging driving section 1c is provided with the antenna 111c, the wireless I/F section 112c and the rotation driving section 120c.

The imaging driving section 1c is provided with a driving CPU 19c that controls the entire imaging driving section 1c, and a memory 190c. A ROM in the memory 190c stores information such as a program for driving the imaging driving section 1c, while a RAM in the memory 190c has a working area to be used during program execution.

The imaging driving section 1c is also provided with a high-speed serial driver 150c, a battery 151c, a DC/DC converter 101c, and a power controller 100c. The high-speed serial driver 150c receives image signals of any of three types; through-image signal, still-image signal and moving-image signal, transmitted from the imaging unit 1a.

Figure 7:
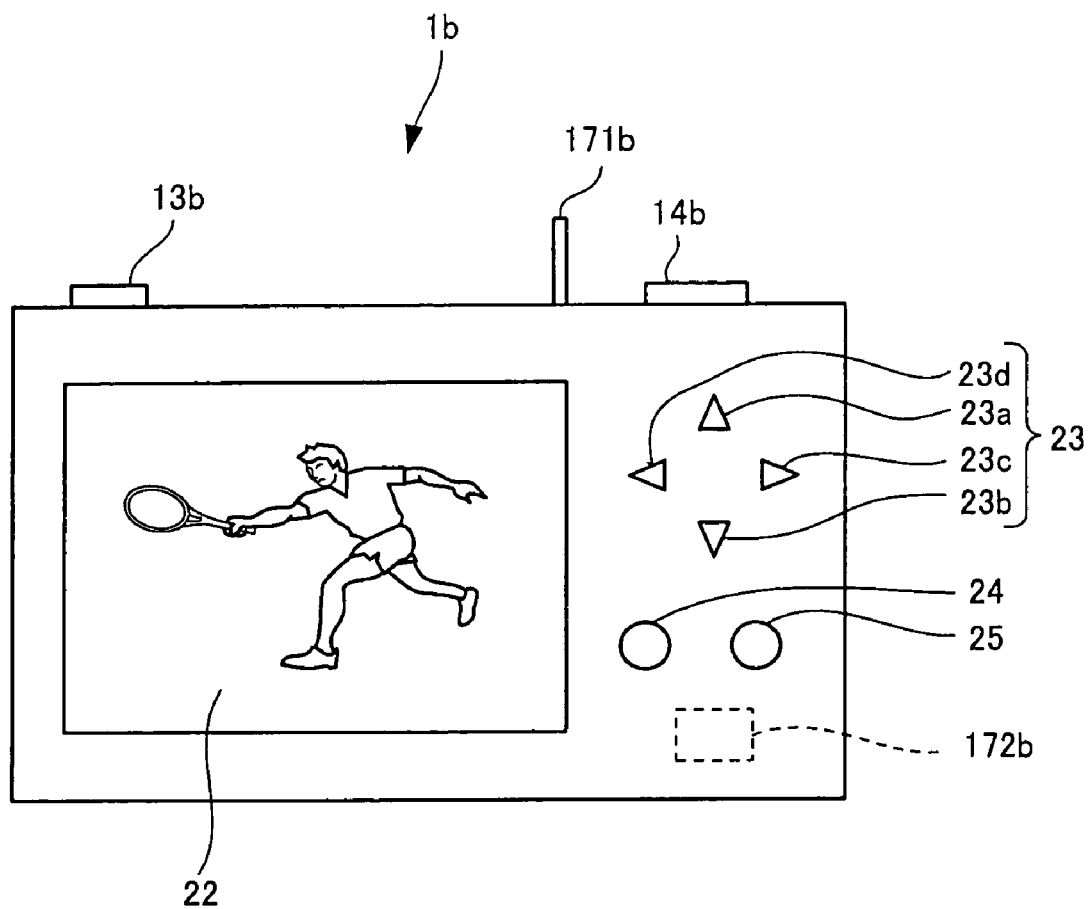
FIG. 7 is a diagram showing the back of the main unit provided in a remote shooting system shown in FIG. 5.

FIG. 7 is a diagram showing the back of the main unit 1b provided in the remote shooting system 1 shown in FIG. 5.

On the back of the main unit 1b shown in FIG. 7, an LCD panel 22 is disposed. Displayed on the LCD panel 22 is a through image based on through-image signals in the state when the main unit 1b is held in a normal position (horizontal position). Next to the LCD panel 22, there is disposed a cross key 23 serving as an operation key. When a menu screen or the like is displayed on the LCD panel 22, a user can select a menu by operating four keys of the cross key 23: an UP key 23a, a DOWN key 23b, a RIGHT key 23c and a LEFT key 23d.

Disposed below the cross key 23 are a menu key 24 and an execution key 25. The menu key 24 is used to display the menu on the LCD panel 22. When the menu is displayed by user operation through the menu key 24 and any of multiple items in the menu displayed on the LCD panel 22 is selected by user operation through any of the four keys of the cross key 23, the selected item is executed upon user operation through the execution key 25.

Figure 8:
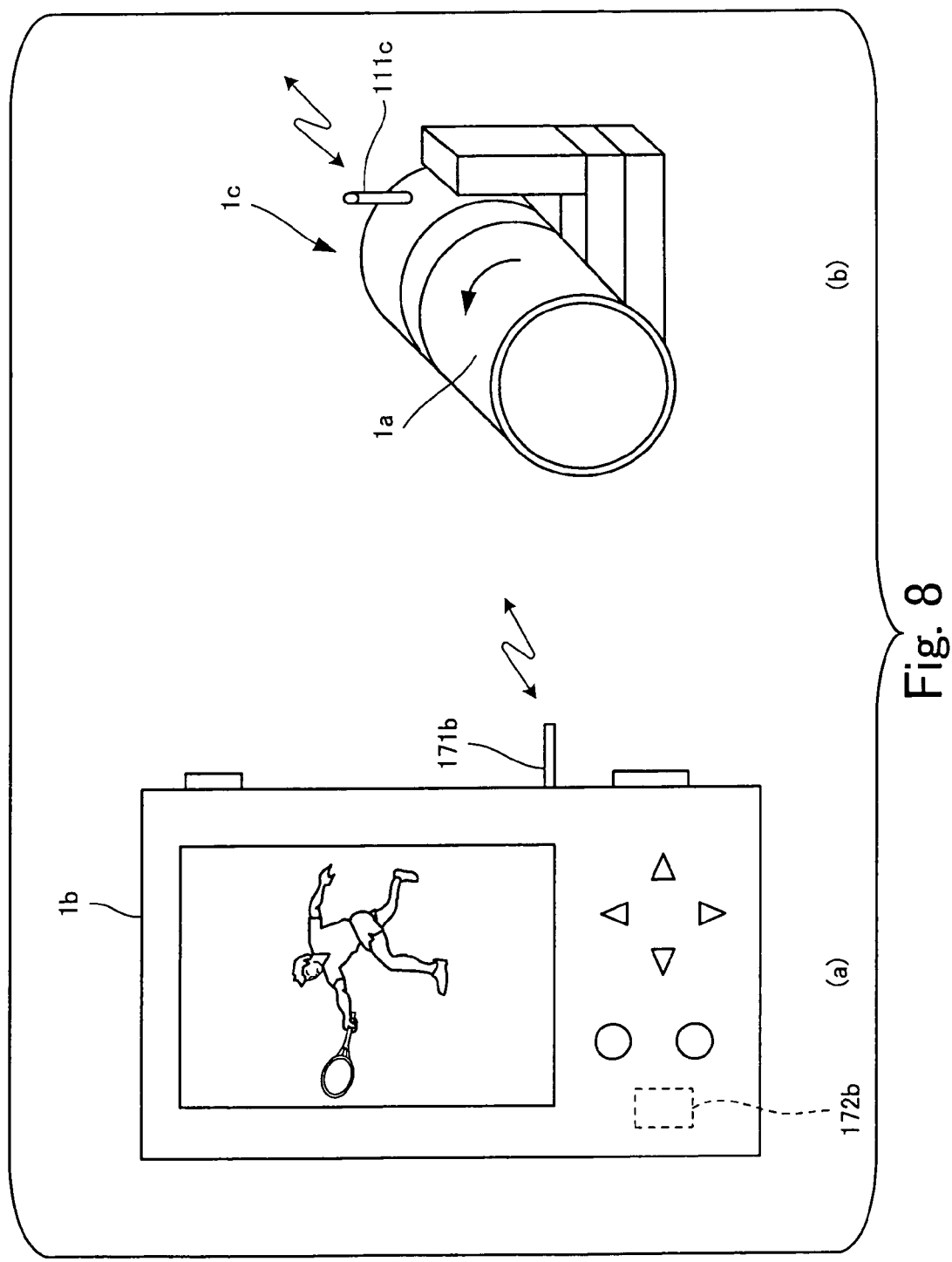
FIG. 8 is a diagram showing a state when vertical shooting is performed with the main unit shown in FIG. 7 rotated 90 degrees rightward.

FIG. 8 is a diagram showing a state when vertical shooting is performed with the main unit 1b shown in FIG. 7 rotated 90 degrees rightward.

As shown in part (a) of FIG. 8, the main unit 1b is rotated 90 degrees rightward so as to carry out vertical shooting. Then, an instruction signal according to the position resulting from the 90 degrees rightward rotation of the main unit 1b is wirelessly transmitted from the position sensor 172b of the main unit 1b via the antenna 171b of the main unit 1b. The instruction signal is received by the wireless I/F section 112c (see FIG. 6) via the antenna 111c of the imaging driving section 1c shown in part (b) of FIG. 8. Based on the instruction signal received by the wireless I/F section 112c, the driving CPU 19c controls the rotation driving section 120c, such that the imaging unit 1a being attached to the imaging driving section 1c is rotated 90 degrees clockwise about the rotation axis parallel to the optical axis of the shooting lens of the imaging unit 1a, while facing in the shooting direction. Therefore, it is possible to readily carry out remote vertical shooting only by moving the main unit 1b in the direction of vertical shooting, i.e. by rotating the main unit 1b 90 degrees rightward as shown in part (a) of FIG. 8, as in the case of vertical shooting with the imaging unit 1a being attached to the main unit 1b. Accordingly, the remote shooting system 1 is provided as a system with excellent and easy operability.

Figure 9:
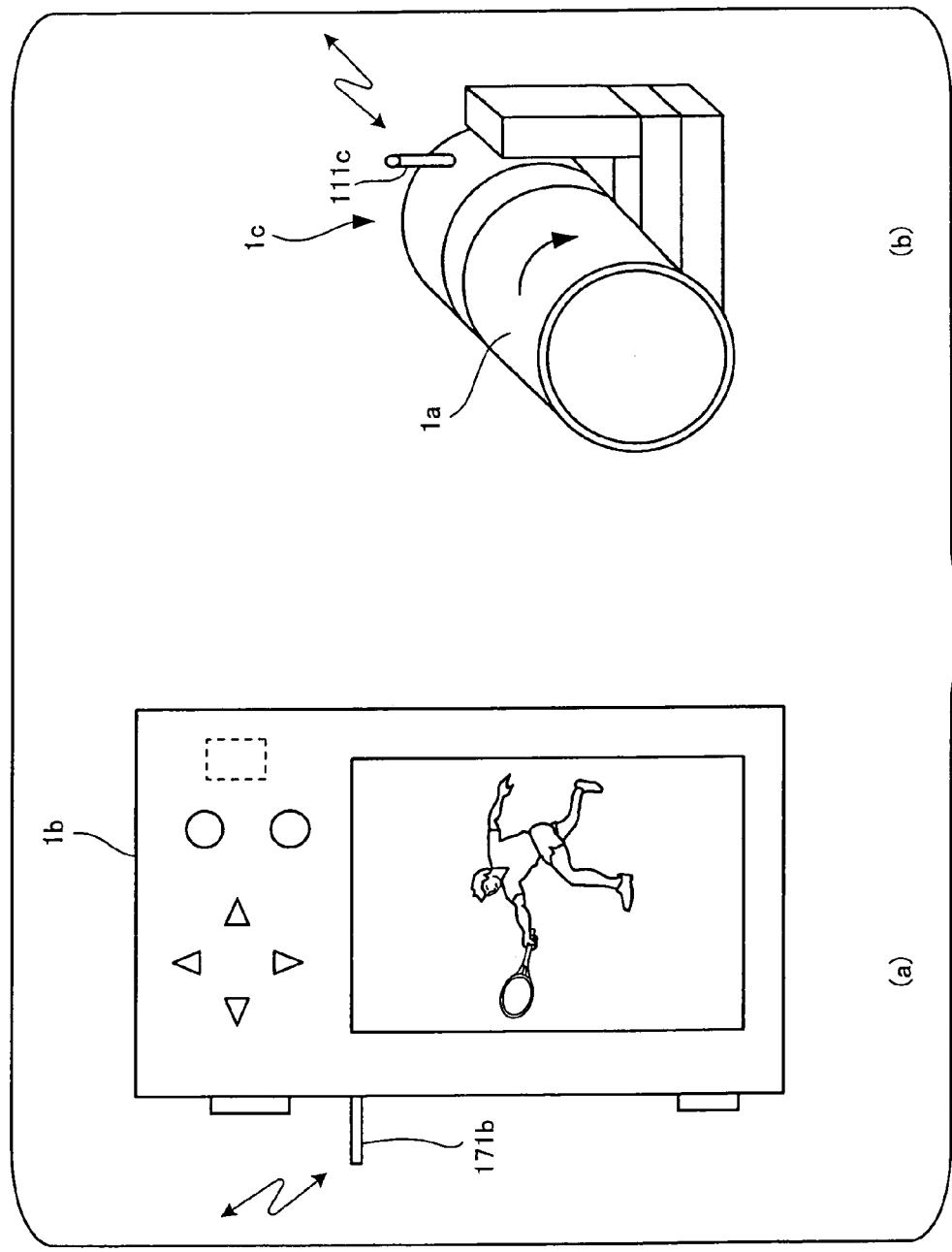
FIG. 9 is a diagram showing a state when vertical shooting is performed with the main unit shown in FIG. 7 rotated 90 degrees leftward.

FIG. 9 is a diagram showing a state when vertical shooting is performed with the main unit 1b shown in FIG. 7 rotated 90 degrees leftward.

As shown in part (a) of FIG. 9, the main unit 1b is rotated 90 degrees leftward so as to carry out vertical shooting. Then, an instruction signal according to the position resulting from the 90 degrees leftward rotation of the main unit 1b is wirelessly transmitted from the position sensor 172b of the main unit 1b via the antenna 171b of the main unit 1b. The instruction signal is received by the wireless I/F section 112c via the antenna 111c of the imaging driving section 1c shown in part (b) of FIG. 9. Based on the instruction signal received by the wireless I/F section 112c, the driving CPU 19c controls the rotation driving section 120c, such that the imaging unit 1a attached to the imaging driving section 1c is rotated 90 degrees counterclockwise about the rotation axis parallel to the optical axis of the shooting lens of the imaging unit 1a, while facing in the shooting direction. Therefore, it is possible to readily carry out remote vertical shooting only by moving the main unit 1b in the direction of vertical shooting, i.e. by rotating the main unit 1b 90 degrees leftward as shown in part (a) of FIG. 9, as in the case of vertical shooting with the imaging unit 1a being attached to the main unit 1b. Accordingly, the remote shooting system 1 is provided as a system with excellent and easy operability, just like the case of the 90-degree rightward rotation.

Figure 10:
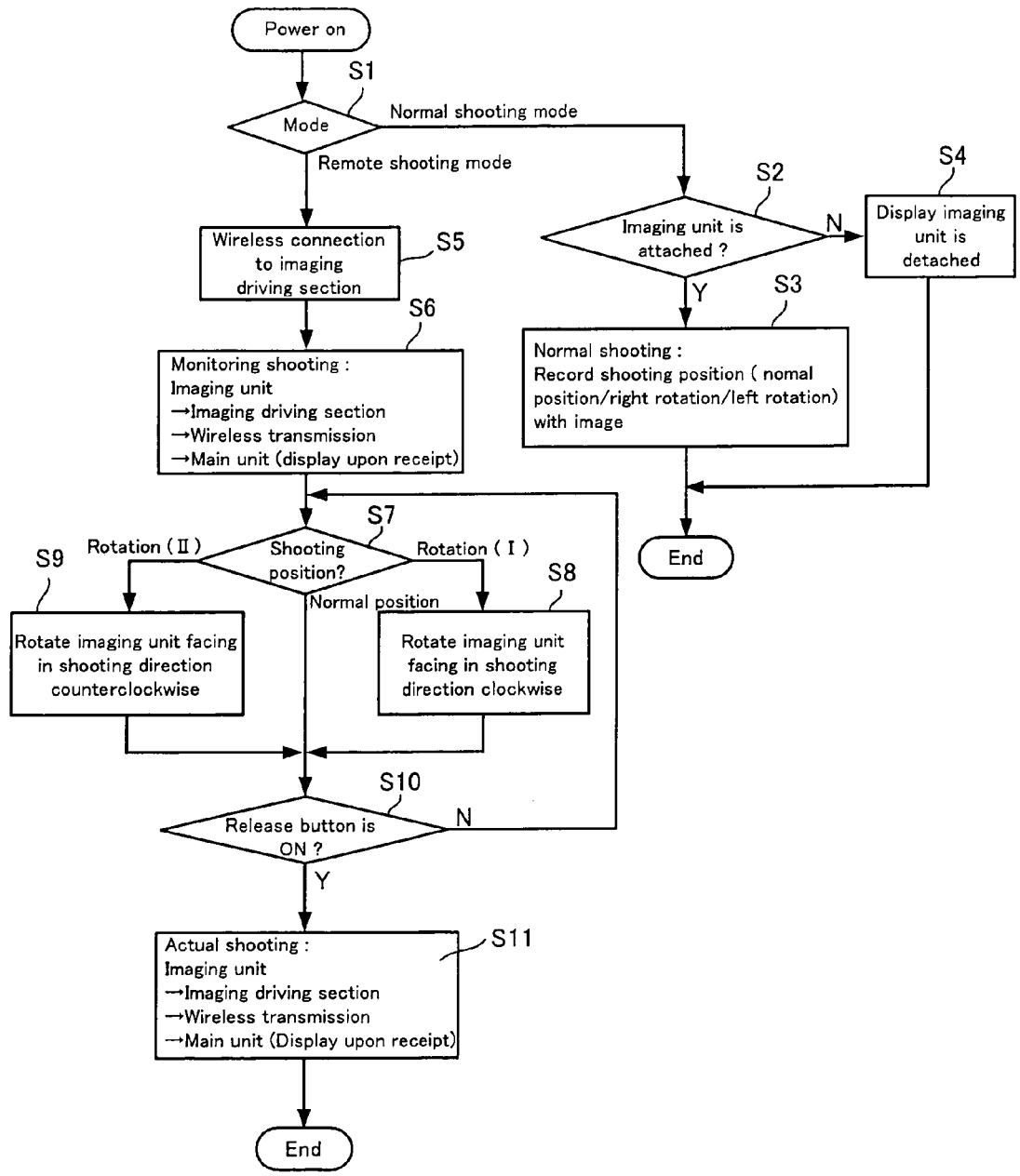
FIG. 10 is a flowchart showing a shooting processing routine executed in the remote shooting system according to the present embodiment.

FIG. 10 is a flowchart showing a shooting processing routine executed in the remote shooting system 1 according to the present embodiment.

Upon power-on of the main unit 1b, the shooting processing routine shown in FIG. 10 begins. First, it is determined whether the current shooting mode is the normal shooting mode or the remote shooting mode at step S1. When it is determined that the current shooting is the normal shooting mode, the flow proceeds to step S2.

At step S2, it is determined whether the imaging unit 1a is attached to the main unit 1b. When it is determined that the imaging unit 1a is attached to the main unit 1b, the flow proceeds to step S3 where the normal shooting is performed. In the normal shooting, information about a shooting position (normal position/right rotation/left rotation) is recorded together with an image. Then, the routine ends. Meanwhile, when it is determined that the imaging unit 1a is not attached to the main unit 1b, the flow proceeds to step S4 where an indication of the fact that the imaging unit 1a is not attached to the main unit 1b is displayed. Then, the routine ends.

Meanwhile, when it is determined that the current shooting is the remote shooting mode, the flow proceeds to step S5 where a wireless transmission to the imaging driving section 1c is made. Subsequently at step S6, monitoring shooting (through-image shooting) is performed. Specifically, an image transmitted from the imaging unit 1a to the imaging driving section 1c is wirelessly transmitted to the main unit 1b that in turn displays the received image.

Subsequently at step S7, a shooting position is determined. Specifically, when it is determined that the main unit 1b is rotated 90 degrees rightward, Rotation (I), the flow proceeds to step S8. At step S8, the imaging unit 1a facing in the shooting direction is rotated clockwise and then the flow proceeds to step S10. Meanwhile, when it is determined that the main unit 1b is rotated 90 degrees leftward, Rotation (II), the flow proceeds to step S9. At step S9, the imaging unit 1a facing in the shooting direction is rotated counterclockwise and then the flow proceeds to step S10. When it is determined that the main unit 1b is in the normal position (horizontal position), the flow directly proceeds to step S10.

At step S10, it is determined whether the release button 13b is pressed or not. When it is determined that the release button 13b is not pressed, the flow goes back to step S7. Meanwhile, when it is determined that the release button 13b is pressed, the flow proceeds to step S11.

At step s11, actual shooting is performed. Specifically, an image transmitted from the imaging unit 1a to the imaging driving section 1c is wirelessly transmitted to the main unit 1b that in turn records the received image. Then, this routine ends.

Now, there will be described an embodiment of the second remote shooting system according to the invention.

In the embodiment of the second remote shooting system according to the invention, a combination of the imaging unit 1a and the imaging driving section 1c in the embodiment of the first remote shooting system according to the invention corresponds to an example of the "imaging section" in the second remote shooting system according to the invention. Also, the main unit 1b in the embodiment of the first remote shooting system according to the invention corresponds to an example of the "operation section" in the second remote shooting system according to the invention. The embodiment of the second remote shooting system according to the invention has such a structure and thus, the detailed description thereof will be omitted.

In the embodiment of the second remote shooting system according to the invention, an instruction signal according to a vertical/horizontal position, which is transmitted from the main unit 1b (operation section), is received by the imaging unit 1a and the imaging driving section 1c (imaging section). Based on the received instruction signal, the imaging unit 1a (part of the imaging section) is rotated about a rotation axis parallel to an optical axis of the shooting lens. Therefore, it is possible to readily carry out remote vertical shooting only by moving the main unit 1b (the operation section) in the direction of vertical shooting. Accordingly, a remote shooting system with easy and excellent operability is provided.

Now, there will be described an embodiment of the camera system(s) according to the invention.

FIGS. 11 through 16 are diagrams used to describe a camera system 2001 according to the embodiment of the camera system(s) of the invention.

Figure 11:
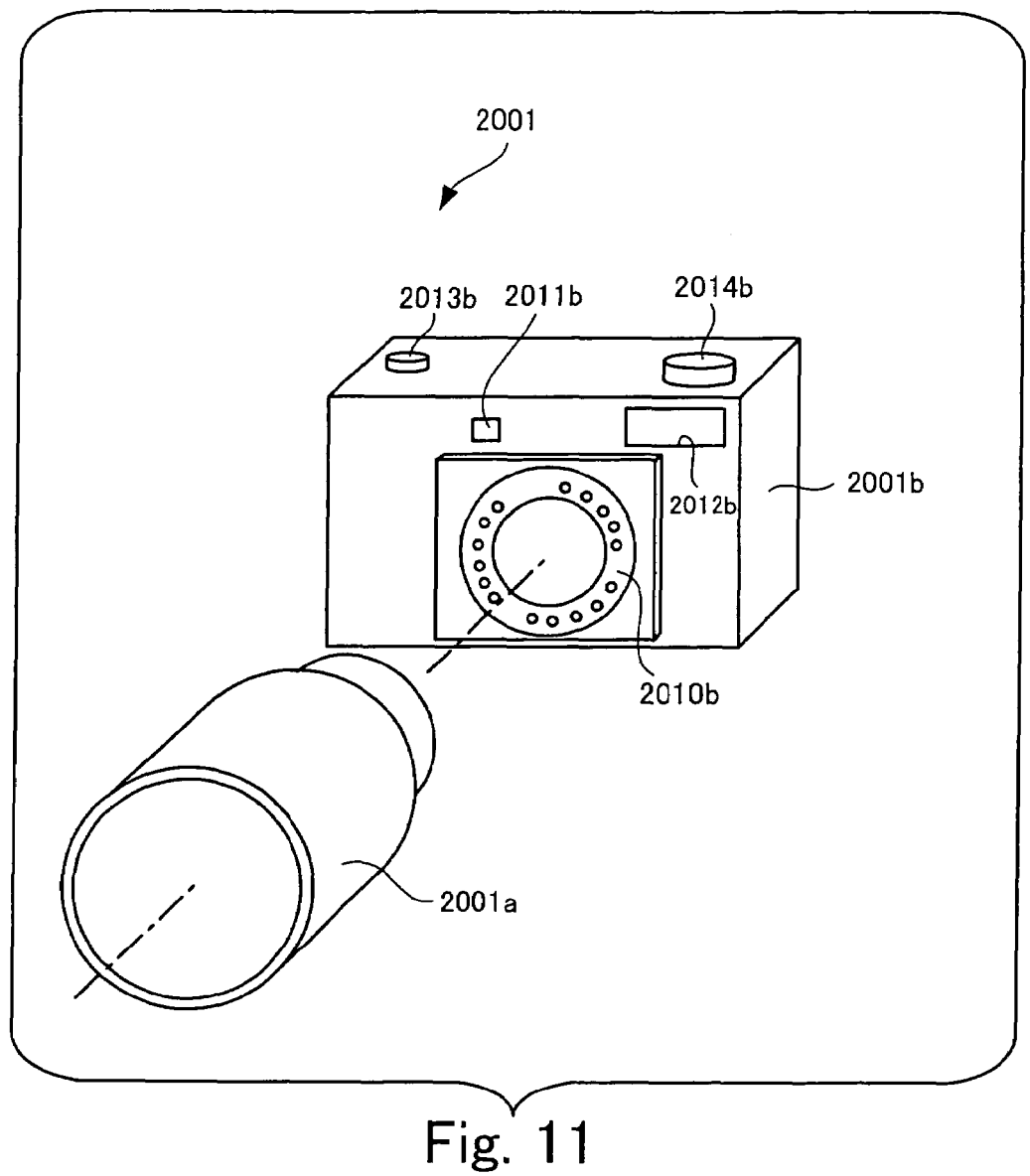
FIG. 11 is a diagram showing a structure of a camera system according to an embodiment of the camera system(s) of the invention in the state when a camera head is about to be attached to a camera main unit.
Figure 12:
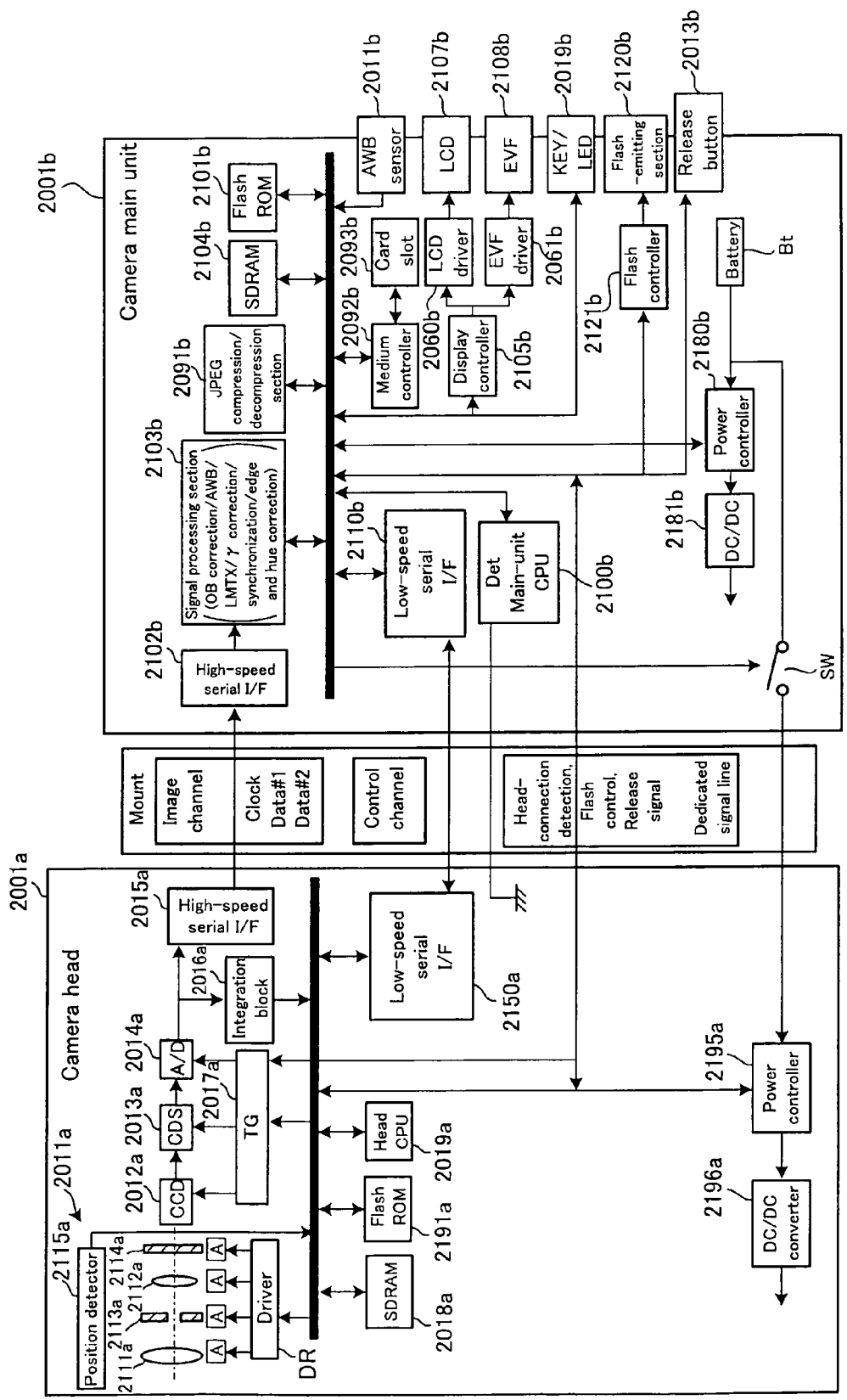
FIG. 12 is a block diagram showing an electric system configuration in the state when the camera head is attached to the camera main unit.
Figure 13:
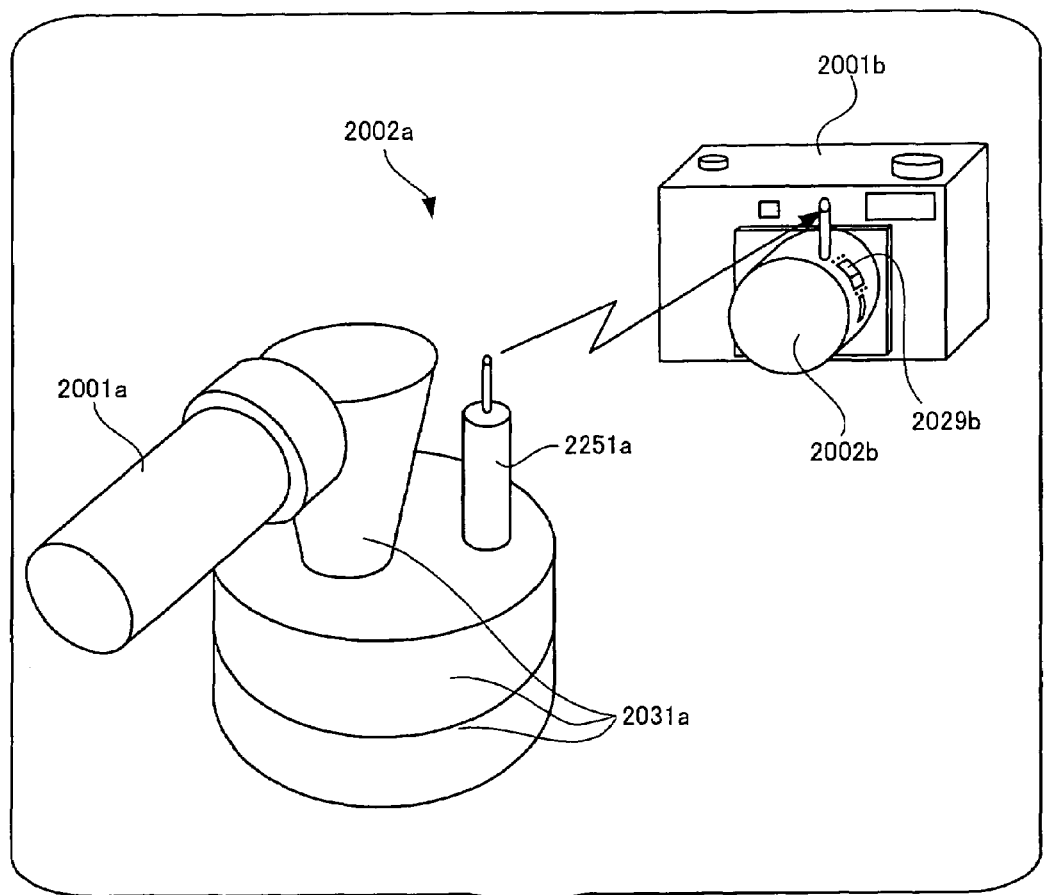
FIG. 13 is a diagram showing the configuration of the camera system according to the embodiment of the camera systems of the invention in the state when the camera head is detached from the camera main unit.
Figure 14:
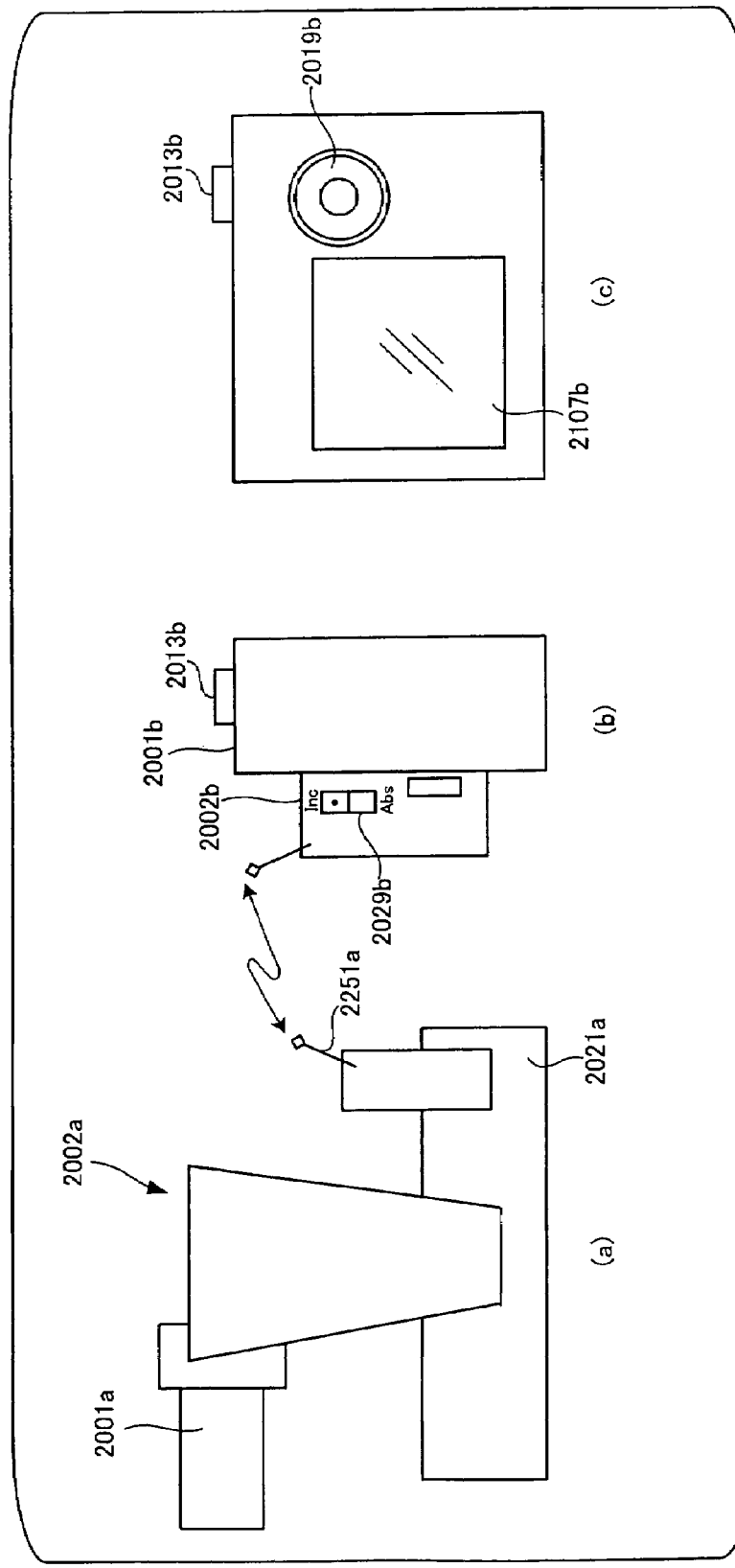
FIG. 14 is a diagram showing a side view of the camera system shown in FIG. 13 and a back view of the camera main unit.
Figure 15:
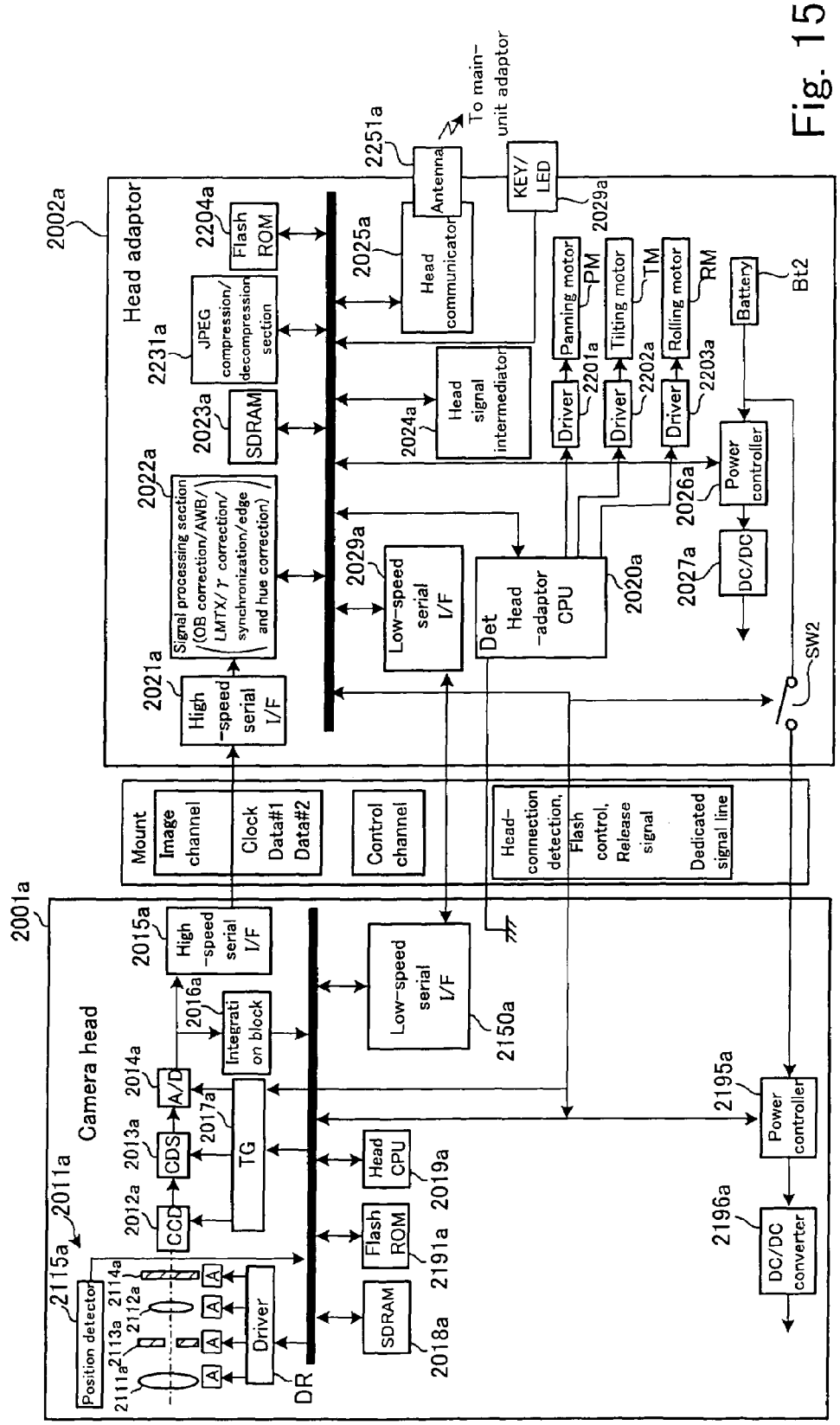
FIG. 15 is a block diagram showing an internal configuration of the camera head and a head adaptor in the detached state shown in FIGS. 13 and 14.
Figure 16:
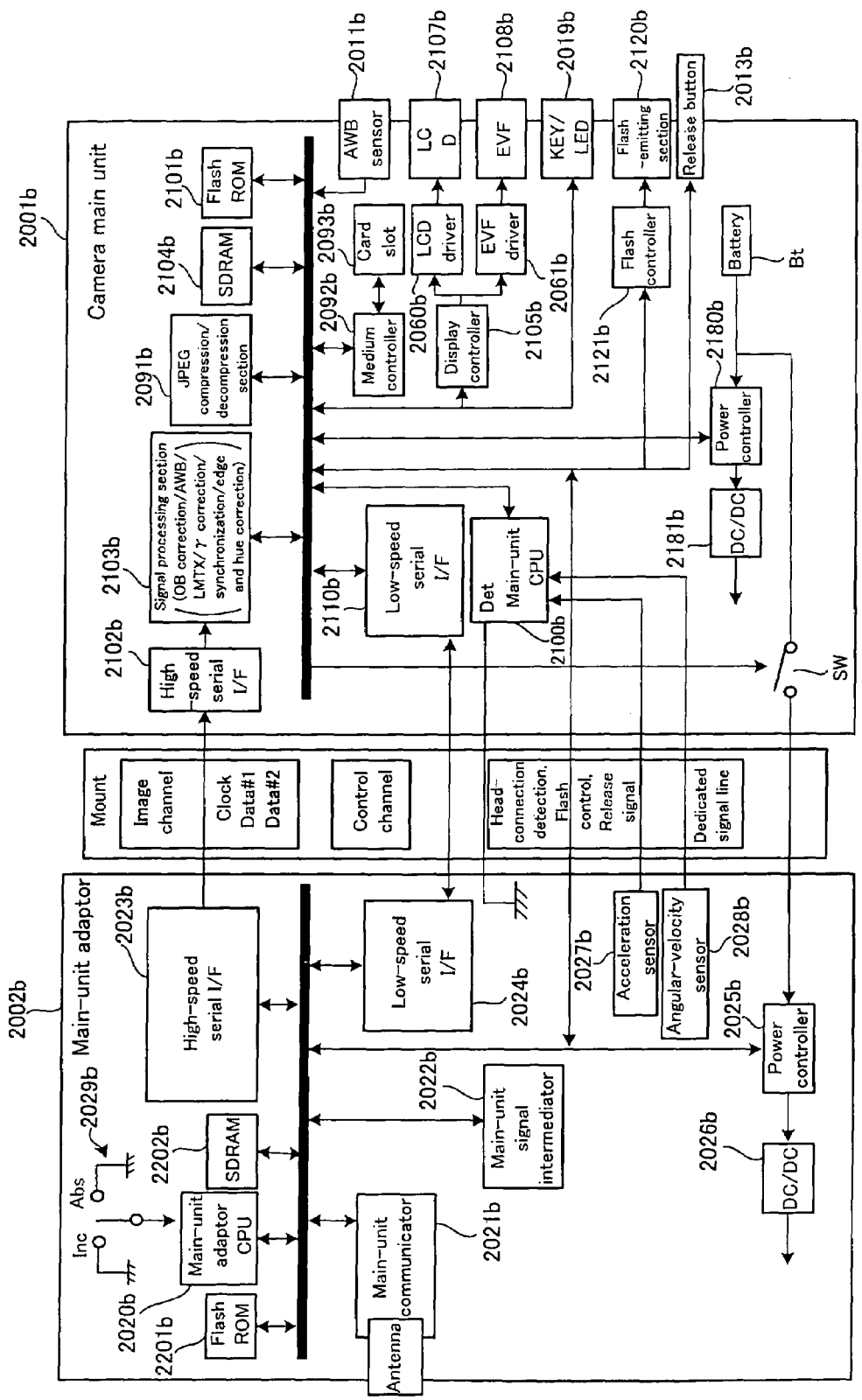
FIG. 16 is a block diagram showing an internal configuration of the camera main unit and a main-unit adaptor in the detached state shown in FIGS. 13 and 14.

FIG. 11 is a diagram that shows a configuration of a camera system 2001 according to the embodiment of the camera system(s) of the invention in the state when a camera head 2001a is about to be attached to a camera main unit 2001b. FIG. 12 is a block diagram showing an electric system configuration in the state when the camera head 2001a is attached to the camera main unit 2001b. FIG. 13 is a diagram showing the configuration of the camera system 2001 according to the embodiment of the camera system(s) of the invention in the state when the camera head 2001a is detached from the camera main unit 2001b. FIG. 14 is a diagram showing a side view of the camera system 2001 shown in FIG. 13 and a back view of the camera main unit 2001b. FIG. 15 is a block diagram showing an internal configuration of the camera head 2001a and a head adaptor 2002a in the detached state shown in FIGS. 13 and 14. FIG. 16 is a block diagram showing an internal configuration of the camera main unit 2001b and a main-unit adaptor 2002b in the detached state shown in FIGS. 13 and 14.

In the camera system 2001 shown in FIGS. 11 and 13, the head adaptor 2002a and the main-unit adaptor 2002b are provided as accessories (see FIG. 13), which are detachably attachable to the camera head 2001a and the camera main unit 2001b, respectively, so as to carry out remote shooting. When these adaptors 2002a and 2002b are attached to the camera head 2001a and the camera main unit 2001b, respectively, shooting can be remotely carried out as shown in FIG. 13. First of all, with reference to FIGS. 11 and 12, there will be described the configuration and operation of the camera system 2001 in the state when the camera head 2001a is attached to the camera main unit 2001b. Secondly, with reference to FIGS. 13 through 16, there will be described the configuration and operation of the camera system 2001 for performing shooting with the camera head 2001a through remote operation from the camera main unit 2001b.

As shown in FIG. 11, the camera system 2001 includes: the camera head 2001a provided with an image-taking optical system and an imaging device; and the camera main unit 2001b that receives image signals from the camera head 2001a via an interface for inputting/outputting signals to/from the camera head 2001a. The camera head 2001a and the camera main unit 2001b to which the camera head 2001a is detachably attachable are separately illustrated in FIG. 11. The camera head 2001a shown in FIG. 11 is one of two or more types of camera heads, and any of the camera heads may be attached to the camera main unit 2001b.

Disposed at the center of the camera main unit 2001b shown in FIG. 11 is a mount section 2010b provided with multiple mount contacts and capable of accepting one end of the camera head 2001a. The end of the camera head 2001a is similarly provided with multiple mount contacts. By aligning the mount contacts of both sides with each other, the end of the camera head 2001a is inserted into and thereby attached to the mount section 2010b of the camera main unit 2001b along a chain line shown in FIG. 11.

These multiple mount contacts are allocated to communication use and power-supply use, through which communications between the camera main unit 2001b and the camera head 2001a are established and power is supplied from the camera main unit 2001b to the camera head 2001a. The mount contacts also include: contacts provided for interfaces of both sides; contacts provided for two dedicated lines to supply a release signal from the camera main unit 2001b to the camera head 2001a; and contacts provided for notifying the camera main unit 2001b that the camera head 2001a is connected thereto.

Above the mount section 2010b, there is disposed an AWB sensor 2011b that detects the type of a light source at the time of shooting. Based on the type of a light source, e.g. sunlight or fluorescent light, detected by the AWB sensor 2011b, appropriate color temperature is set in a signal processing section that will be described later and thus an optimum white balance adjustment is made. Disposed next to the AWB sensor 2011b is a flash window 2012b through which a flash is emitted from a flash emitting section disposed inside the camera main unit 2001b. Disposed on the top face of the camera main unit 2001b are a release button 2013 and a mode dial 2014b. The mode dial 2014b is operated to select either a shooting mode or a replay mode, and further to select a still-image-shooting mode or a movie-shooting mode when the shooting mode is selected. A power switch is provided integrally with the mode dial 2014b so that a user can turn on the power by operating the mode dial 2014b.

Now, there will be described internal configurations of the camera head 2001a and the camera main unit 2001b with reference to FIG. 12.

The left part of FIG. 12 shows an electric system of the camera head 2001a, while the right part of FIG. 12 shows an electric system of the camera main unit 2001b.

Before describing image-signal processing systems of the camera head 2001a and the camera main unit 2001b, there will be described a configuration related to a battery Bt serving as a power source for operating the camera system 2001.

In the camera system 2001 of the present embodiment, the camera head 2001a and the camera main unit 2001b operate with the power supplied from the battery Bt of the camera main unit 2001b.

FIG. 12 illustrates a power controller 2180b provided between the battery Bt and a DC/DC converter 2181b of the camera main unit 2001b. When a switch in the power controller 2180b is connected by operation of the power switch included in a KEY/LED 2019b (the mode dial 2014b shown in FIG. 11 is also included herein), power is supplied to the DC/DC converter 2181b (shown as "DC/DC" in FIG. 12) that in turn supplies the power to each block, thereby activating the camera main unit 2001b.

When the camera main unit 2001b is thus activated by operation through the power switch, a main-unit CPU 2100b starts controlling the operation of the camera main unit 2001b. At this point, if a ground signal (GND) is supplied from the camera head 2001a to a detection terminal (Det) of the main-unit CPU 2100b, the main-unit CPU 2100b detects a state that the camera head 2001a is attached.

When the camera head 2001a is attached to the main-unit CPU 2100b and the power switch in the KEY/LED 2019b (including the mode dial 2014b) is turned on, the main-unit CPU 2100b can detect the attached state of the camera head 2001a only based on the fact that a ground signal (GND) is supplied to the detection terminal (Det) of the main-unit CPU 2100b, thereby turning on a switch SW. Upon turning on of the switch SW, the battery Bt of the main-unit CPU 2100b is connected to a power controller 2195a and further to a DC/DC converter 2196a of the camera head 2001a. This makes it possible to immediately supply power from the battery Bt of the main-unit CPU 2100b to the camera head 2001a at the time of turning on of the power switch, when the camera head 2001a is attached to the main-unit CPU 2100b.

In this way, power is automatically supplied to the camera head 2001a when the main-unit CPU 2100b detects attachment of the camera head 2001a. This enables the main-unit CPU 2100b to request a head CPU 2019a of the camera head 2001a to transmit initialization information, by controlling a low-speed serial interface (hereinafter referred to as "low-speed serial I/F") 2110b at the time of power-on. Upon receipt of the request, the head CPU 2019a transmits the initialization information to the main-unit CPU 2100b. The main-unit CPU 2100b then executes initialization according to the type of the camera head 2001a based on the received initialization information. Upon completion of the initialization, the main-unit CPU 2100b requests the head CPU 2019a via the low-speed serial I/F 2110b to transmit a through image if the mode at the time of power on is the shooting mode. In the following description, image signals representing a through image will be referred to as "through-image signals."

When the request for the transmission of the through image is received by the head CPU 2019a of the camera head 2001a from the main-unit CPU 2100b via a low-speed serial I/F 2150a, the head CPU 2019a causes a CCD 2012a to start generating through-image signals at a predetermined frame rate by controlling a timing generator (TG) 2017a.

Now, the configuration and operation of the camera system 2001 will be described more in detail.

As shown in FIG. 12, the camera head 2001a forming part of the camera system 2001 is provided with an image-taking optical system 2011a and the CCD 2012a. Disposed within the image-taking optical system 2011a are a zoom lens 2111a, a focus lens 2112a, a diaphragm 2113a and a mechanical shutter 2114a. After power is supplied from the camera main unit 2001b to the camera head 2001a, when the camera head 2001a is notified of the shooting mode as the current mode by the camera main unit 2001b, the mechanical shutter 2114a is driven by a driver DR and then a light-receiving surface is made open, so that the system 2001 enters a shooting standby state.

Subsequently, upon receipt of a request for the transmission of through-image signals, the head CPU 2019a repeats supply of an exposure-starting signal and then an exposure-ending signal at a predetermined interval therebetween to the CCD 2012a, by controlling the TG 2017a, so that the CCD 2012*a* generates through-image signals. At the same time, timing signals are also supplied from the TG 2017*a* to a CDS 2013*a* and an A/D section 2014*a* provided in a subsequent stage, so that image signals can be timely processed. In the CDS 2013*a*, image signals (analog RGB signals) output from the CCD 2012*a* are subjected to noise reduction. In the A/D section 2014*a*, the analog RGB signals are converted into digital form. The digital RGB signals are then transmitted to the camera main unit 2001*b* through a high-speed serial I/F 2015*a*. The digital RGB signals are also supplied from the A/D section 2014*a* to an integration block 2016*a* where focus and exposure adjustments are made to the digital RGB signals.

In order to generate a through image, a clear focused image to which exposure adjustment has been made must be formed on a light-receiving surface of the CCD 2012*a*. Therefore, based on results of exposure adjustment and focus detection carried out by the integration block 2016*a*, the head CPU 2019*a* instructs the driver DR to adjust the position of the focus lens 2112*a* and the aperture of the diaphragm 2113*a*, so that a clear focused image with correct exposure can be formed on the light-receiving surface of the CCD 2012*a*. The head CPU 2019*a* determines that the focus lens 2112*a* is at a focus position upon receipt of a position signal sent from a position detector 2115*a*. Upon such determination, the head CPU 2019*a* instructs the driver DR to immediately stop driving of the focus lens 2112*a*.

In the present embodiment, through-image signals are output from the CCD 2012*a* to the CDS 2013*a* at a frame rate, of, for example, 1/30 s, in synchronism with timing signals from the TG 2017*a*. After being subjected to noise reduction by the CDS 2013*a*, the through-image signals are sent to the A/D section 2014*a* where the signals are subjected to analog-signal conversion and then supplied to the high-speed serial I/F 2015*a*. The camera main unit 2001*b* also has a similar high-speed serial I/F 2102*b* and thus, the through-image signals are transmitted from the camera head 2001*a* to the camera main unit 2001*b* through both the high-speed serial I/Fs 2015*a* and 2102*b*. The through-image signals thus transmitted represent a subject image captured by the shooting lens in the image-taking optical system 2011*a*, and thus these signals are used to display the subject image on the LCD panel of a LCD 2107*b* and an electrical view finder (EVF) 2108*b*, in the state when the shooting mode is selected by the mode dial 2014*b* (included in the KEY/LED 2019*b*). In addition to through-image signals, image signals transmitted from the camera head 2001*a* to the camera main unit 2001*b* through both the high-speed serial I/Fs 2015*a* and 2102*b* include: image signals representing a still image (hereinafter referred to as "still-image signals") obtained by user operation through a release button 2013*b* when the still-image-shooting mode in the shooting mode is selected; and image signals representing a moving image (hereinafter referred to as "moving-image signals") obtained by user operation through the release button 2013*b* when the movie-shooting mode in the shooting mode is selected. In response to a request from the camera main unit 2001*b*, image signals of any of these three types are transmitted to the camera main unit 2001*b* through the high-speed serial I/Fs 2015*a* and 2102*b*.

A Flash ROM 2191*a* provided in the camera head 2001*a* stores, in addition to a program describing procedures for operating the camera head 2001*a*, data such as configuration information about the camera head 2001*a*. If a command for the transmission of the configuration information as initialization information is sent from the camera main unit 2001*b* through the low-speed serial I/Fs 2110*b* and 2150*a*, the camera head 2001*a* sends the configuration information stored in the Flash ROM 2191*a* to the camera main unit 2001*b* through the low-speed serial I/Fs 2110*b* and 2150*a* in response to such a request.

The low-speed serial I/Fs 2110*b* and 2150*a* are thus used to exchange commands between the camera main unit 2001*b* and the camera head 2001*a* at the time of shooting. When, for example, a command for the transmission of image signals (any of through-image signals, still-image signals and moving-image signals) is sent from the camera main unit 2001*b* to the camera head 2001*a* through the low-speed serial I/Fs 2110*b* and 2150*a*, the camera head 2001*a* transmits digital image signals (any of through-image signals, still-image signals and moving-image signals) to the camera main unit 2001*b* through the high-speed serial I/Fs 2015*a* and 2102*b* faster than the low-speed serial I/Fs 2110*b* and 2150*a*. Incidentally, in FIG. 12, the word "image channel" represents the transmission of image signals from the camera head 2001*a* to the camera main unit 2001*b* through the high-speed serial I/Fs 2015*a* and 2102*b* linking therebetween, while the word "control channel" represents the transmission/receipt of control signals between the camera main unit 2001*b* and the camera head 2001*a* through the low-speed serial I/Fs 2110*b* and 2150*a*. Further, the word "dedicated signal line" represents the transmission of a release signal from the release button 2013*b* through a dedicated line in FIG. 12. FIG. 12 also shows image data lines "DATA #1" and "DATA #2" representing two image channels and also shows a clock line provided between the high-speed serial I/Fs 2015*a* and 2102*b* in addition to the image channels.

The camera head 2001*a* and the camera main unit 2001*b* thus configure the camera system 2001 that performs shooting.

In the camera system 2001 of the present embodiment, the camera head 2001*a* and the camera main unit 2001*b* respectively have the head adaptor 2002*a* and the main-unit adaptor 2002*b* each provided with a communicator for wireless communications, in order to carry out shooting even when the camera head 2001*a* and the camera main unit 2001*b* are separated from each other.

FIGS. 13 and 14 show the head adaptor 2002*a* that has: a panhead section 2031*a* to which the camera head 2001*a* is detachably attached instead of being attached to the camera main unit 2001*b*; and a head communicator (only whose-antenna 2251*a* used for communications is shown in FIG. 13) that applies signal processing to image signals received from the camera head 2001*a*. When the head adaptor 2002*a* is attached to the camera head 2001*a* as shown in FIG. 13, the main-unit adaptor 2002*b* in place of the camera head 2001*a* is also attached to the camera main unit 2001*b*, so that the camera head 2001*a* can carry out shooting according to operation instructions transmitted from the camera main unit 2001*b*. In this state, when a selector switch 2029*b* of the main-unit adaptor 2002*b* is set at Abs side (see FIG. 14), the panhead section 2031*a* is driven according to the position of the camera main unit 2001*b* so as to adjust the position of the camera head 2001*a*. When the switch 2029*b* is shifted to Inc side, the position of the camera head 2001*a* becomes adjustable according to operation through a cross key 2039*b* (see FIG. 14).

Specifically, the position of the camera head 2001*a* attached to the panhead section 2031*a* can be changed by operation through the cross key 2039*b* of the camera main unit 2001*b* when the switch 2029*b* is set at the Inc side, while the position of the camera head 2001*a* can be changed according to the position of the camera main unit 2001*b* when the switch 2029*b* is set at the Abs side.

Now, there will be described the respective internal configurations of the head adaptor 2002a and the main-unit adaptor 2002b.

The head adaptor 2002a shown in FIG. 15 is provided with: a head communicator 2025a that performs wireless communications with the main-unit adaptor 2002b; and a head signal intermediator 2024a that converts image signals generated in the camera head 2001a into a form suitable for wireless communications. Meanwhile, the main-unit adaptor 2002b shown in FIG. 16 is provided with: a main-unit communicator 2021b that performs wireless communications with the head adaptor 2002a; and a main-unit signal intermediator 2022b that converts image signals generated in the camera head 2001a and received by the main-unit communicator 2021b back to the form used when the image signals are generated in the camera head 2001a. The head signal intermediator 2024a and the main-unit signal intermediator 2022b appropriately apply signal-form conversion not only to image signals transmitted from the camera head 2001a to the camera main unit 2001b but also to operation signals transmitted from the camera main unit 2001b to the camera head 2001a. Therefore, wireless communications using any types of signals can be smoothly performed between the camera main unit 2001b and the camera head 2001a.

In this way, when the head adaptor 2002a and the main-unit adaptor 2002b are each provided with such a circuit that performs wireless communications, it is possible to carry out shooting with the camera head 2001a being attached to the panhead section 2031a of the head adaptor 2002a through remote operation from the camera main unit 2001b.

First, the configuration of the head adaptor 2002a will be described.

The head adaptor 2002a shown in FIG. 15 has a battery Bt2. When the head adaptor 2002a in place of the camera main unit 2001b is attached to the camera head 2001a, the camera head 2001a is supplied with power from the battery Bt2 instead of power from the battery Bt of the camera main unit 2001b.

As in the case of the camera main unit 2001, the head adaptor 2002a is provided with a high-speed serial I/F 2021a used for image-signal communications and a low-speed serial I/F 2029a used for control-signal communications with the camera head 2001a. The high-speed serial I/F 2021a and the low-speed serial I/F 2029a are connected to a head-adaptor CPU 2020a via a bus to which a Flash ROM 2204a storing a program describing procedures and a SDRAM 2023a serving as a buffer memory are also connected. Therefore, according to the procedures described in the program stored in the Flash ROM 2204a, the head-adaptor CPU 2020a causes the high-speed serial I/F 2021a to receive image signals from the camera head 2001a and causes the SDRAM 2023a to temporarily store the received image signals. When the SDRAM 2023a is thus provided, the head-adaptor CPU 2020a can read out image signals stored in the SDRAM 2023a, supply the read-out signals to a signal processing section 2022a, and store again the image signals processed by the signal processing section 2022a in the SDRAM 2023a.

This configuration makes it possible to use the SDRAM 2023a for the purpose of adjusting processing timing at each section. For example, the head signal intermediator 2024a timely converts signals into the form suitable for wireless communications by using the SDRAM 2023a.

Subsequently, the image signals converted into the form suitable for wireless communications by the head signal intermediator 2024a are transmitted to the camera main unit 2001b from the head communicator 2025a. When image signals are thus converted into the form suitable for wireless communications, the occurrence of errors during wireless transfer is remarkably reduced so that signals can be correctly transmitted to the camera main unit 2001b.

The head communicator 2025a also serves as a receiver that receives operation signals from the camera main unit 2001b and corresponds to an example of the "head receiving section" of the invention.

When an operation signal is transmitted from the camera main unit 2001b to the head adaptor 2002a, the operation signal is received by the head communicator 2025a. Based on the received operation signal, a panning motor PM, a tilting motor TM and a rolling motor RM of the panhead section 2031a (see FIG. 13) are driven under the control of the head-adaptor CPU 2020a. The head-adaptor CPU 2020a supplies each of drivers 2201a, 2202a and 2203a with a control signal, so that the drivers 2201a, 2202a and 2203a drive the respective motors TM, PM and RM by supplying these motors with motor driving signals according to the respective control signals. The panhead section 2031a is provided with a three-axis actuator that enables the panhead section 2031a to be driven in any of a panning direction, a tilting direction and a rolling direction according to the corresponding driven motor, so that the position of the camera head 2001a is adjusted. In the present embodiment, there are provided three actuators (such as: a rotation section that rotates according to a turning force transmitted from a motor through, for example, a gear train or a link belt; and a tilting section that tilts according to a turning force converted into a linear motion by a cam) that are driven to move the panhead section 2031a in the panning, tilting, rolling directions, respectively. Each actuator is driven according to a turning force generated by the corresponding motor (any of the motors 2201a, 2202a and 2203a), so that the position of the camera head 2001a can be precisely adjusted.

The head adaptor 2002a thus configured is used with the main-unit adaptor 2002b in a pair. Now, the main-unit adaptor 2002b will be described below.

The main-unit adaptor 2002b shown in FIG. 16 is a unit attachable, in place of the camera head 2001a, to the camera main unit 2001b, and operates with power supplied from the camera main unit 2001b as in the case of the camera head 2001a.

The main-unit adaptor 2002b is provided with: a main-unit adaptor CPU 2020b that controls the entire operations of the main-unit adaptor 2002b; and a high-speed serial I/F 2023b used for image-signal communications as well as a low-speed serial I/F 2024b used for control-signal communications with the camera main unit 2001b, as in the case of the camera head 2001a.

The high-speed serial I/F 2023b and the low-speed serial I/F 2024b are connected to the main-unit adaptor CPU 2020b through a bus to which a Flash ROM 2201b storing a program describing procedures and a SDRAM 2202b serving as a buffer memory are also connected.

Therefore, image signals transmitted from the head adaptor 2002a and received by the main-unit communicator 2021b can be temporarily stored in the SDRAM 2202b under the control of the main-unit adaptor CPU 2020b according to the procedures described in the program stored in the Flash ROM 2201b. When the SDRAM 2202b is thus provided, timing for sequential transmission of image signals from the head adaptor 2002a and timing for processing in each section of the main-unit adaptor 2002b are well adjusted, so that the main-unit signal intermediator 2022b appropriately converts image signals in the form suitable for wireless communications into the form used when the image signals are generated by the CCD 2012a of the camera head 2001a.

When image signals are transmitted to the camera main unit 2001b through the high-speed serial I/F 2023b of the main-unit adaptor 2002b in this way, if the transmitted image signals are, for example, through-image signals, the signals are then supplied to a display controller 2105b that in turn displays a through-image based on the through-image signals on a display screen. When the release button 2013b is pressed while the through image is displayed, a release signal is transmitted from the camera main unit 2001b to the camera head 2001a through the main-unit communicator 2021b of the main-unit adaptor 2002b and the head communicator 2025a of the head adaptor 2002a. In response to the release signal, still-image signals generated by the CCD 2012a of the camera head 2001a are transmitted to the camera main unit 2001b through the head adaptor 2002a. Upon receipt of the still-image signals by the main-unit communicator 2021b in the main-unit adaptor 2002b, the received still-image signals are then temporarily stored in the SDRAM 2202b. When all the still-image signals are stored in the SDRAM 2202b, the still-image signals are read out from the SDRAM 2202b and then supplied to the camera main unit 2001b through the high-speed serial I/Fs 2023b and 2102b. Subsequently, the still-image signals are processed by a signal processing section 2103b, and the processed image signals are compressed by a JPEG compression/decompression section 2091b. The compressed image signals are then stored together with compression information in a memory card inserted into a card slot 2093b.

In the camera system of the present embodiment, the main-unit adaptor 2002b includes the switch 2029b. Depending on the state of the switch 2029b, the position of the camera head 2001a can be determined based on operation through the cross key 2039b or based on the position of the camera main unit 2001b. For example, when the switch 2029b is set at the Inc (increment) side, the cross key 2039b in the camera main unit 2001b is enabled, so that an operation signal according to operation through the cross key 2039b can be transmitted from the main-unit communicator 2021b to the head adaptor 2002a, thereby adjusting the position of the camera head 2001a. Meanwhile, when the switch 2029b is set at the Abs (absolute) side, the cross key 2039b in the camera main unit 2001b is disabled, so that an operation signal for adjusting the position of the camera head 2001a according to the position of the camera main unit 2001b detected by a three-axis acceleration sensor 2027b of the main-unit adaptor 2002b is transmitted from the main-unit communicator 2021b to the head adaptor 2002a, thereby adjusting the position of the camera head 2001a. The main-unit communicator 2021b corresponds to an example of the "main-unit transmission section" according to the invention. Incidentally, in order to allow the head adaptor 2002a to recognize whether a received signal is an operation signal according to operation through the cross key 2039b or an operation signal according to detection by the acceleration sensor 2027b, data is transmitted with a control code "Inc" or "Abs" added to the head of the data. The control data corresponds to an example of the "switching information" according to invention. This configuration enables the head-adaptor CPU 2020a to immediately recognize whether a received signal is a signal based on operation through the cross key 2039b or a signal based on the position of the camera main unit 2001b and thus, there is no need for the head-adaptor CPU 2020a to decode the received signal.

Accordingly, for example, a user can shift the switch 2029b to the Abs side so as to make any adjustment by using only the display screen of the camera main unit 2001b as a finder, without looking at the camera head 2001a. In this case, the user as a photographer at the camera main unit 2001b can carry out shooting as if carrying out shooting with the camera head 2001a being attached to the camera main unit 2001b whose display screen is watched by the user, if without considering the position of the camera head 2001a. Meanwhile, in a situation where the user can look at a subject through both the camera main unit 2001b and the camera head 2001a in the same manner, the user can shift the switch 2029b to the Inc side so as to adjust the position of the camera head 2001a by operating the cross key 2039b serving as an operation member.

Further, in the present embodiment, if only the acceleration sensor 2027b is provided, it is possible to detect the position determined after operation of the camera main unit 2001b to which the main-unit adaptor 2002b is attached, but it is impossible to detect the position (a rotation angle etc.) changing during the camera main unit 2001b is being operated. Therefore, in the present embodiment, there is provided an angular-velocity sensor 2028b that detects a state determined after the position of the camera main unit 2001b is changed through adjustment.

This improved configuration enables the panhead section 2031a to promptly respond to relatively quick panning or tilting operation, thereby making it possible to promptly adjust the position of the camera head 2001a according to the position of the camera main unit 2001b. Accordingly, a user can carry out any of panning, tilting and rolling operations even when the camera head 2001a is separated from the camera main unit 2001b, as if carrying out the operation with the camera head 2001a being attached to the camera main unit 2001b.

Lastly, there will be described the panning, tilting and rolling directions.

Figure 17:
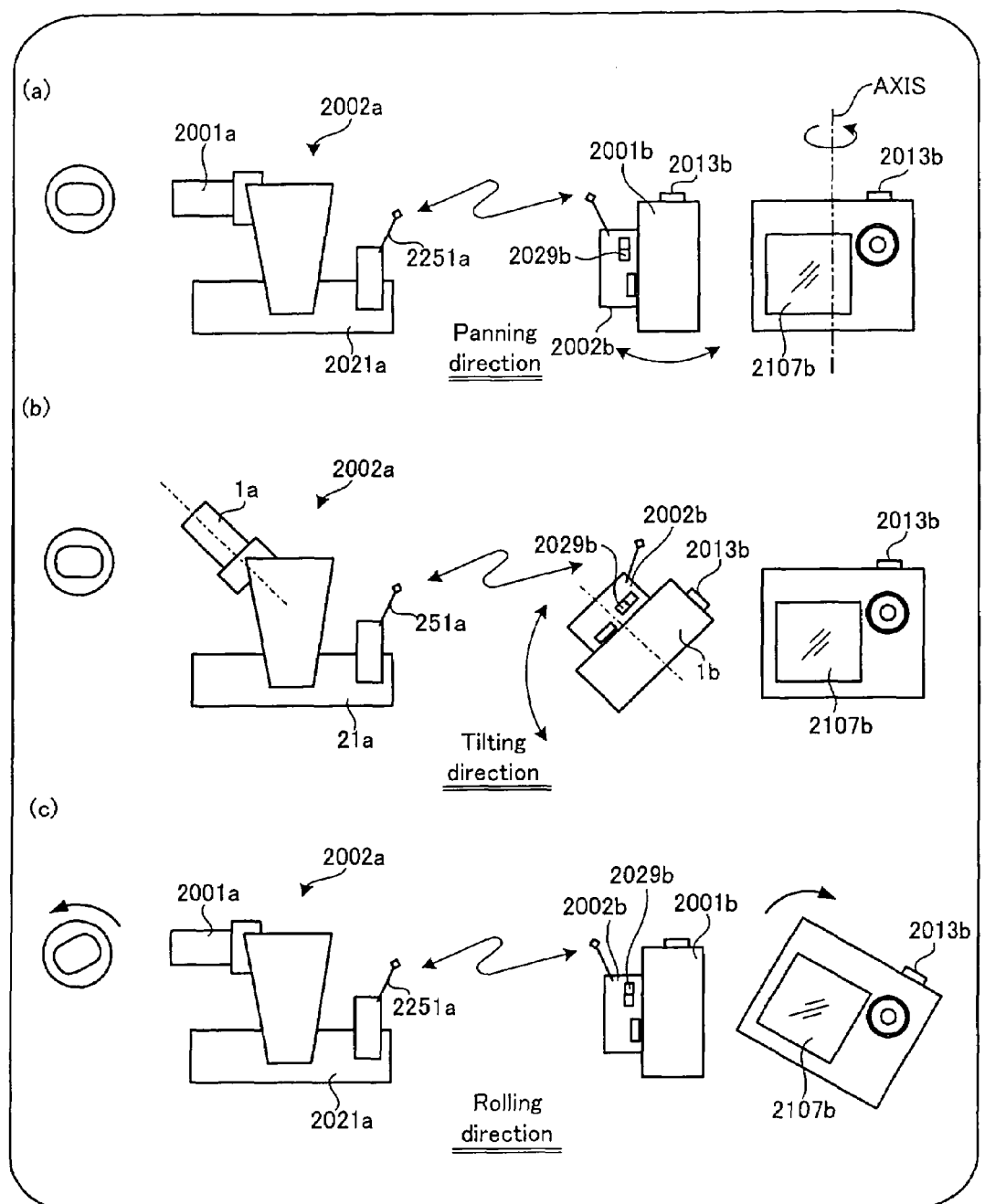
FIG. 17 is a diagram showing panning, tilting and rolling directions.

FIG. 17 is a diagram showing the panning, tilting and rolling directions.

Part (a) of FIG. 17 shows the panning direction, part (b) of FIG. 17 shows the tilting direction, and part (c) of FIG. 17 shows the rolling direction.

Illustrated at the left end of each of parts (a), (b) and (c) of FIG. 17 is a view frame. Meanwhile, illustrated at the right end of each of parts (a) and (b) of FIG. 17 is the original position of the camera main unit 2001b, and an operation direction used at the time of shooting is illustrated on the left side of the original position.

Meanwhile, illustrated at the right end of part (c) of FIG. 17 is a rolling direction in which a rolling operation is made, and the original position of the camera main unit 2001b is shown on the left side of the illustrated rolling direction.

When the panning shown in part (a) of FIG. 17 is performed, the camera main unit 2001b is made to swing in an arrow direction shown in part (a) of FIG. 17 (the camera main unit 2001b is first held as shown on the left portion of part (a) of FIG. 17, and then rotated about a central AXIS at the center in the width direction). When the most desirable composition is obtained as a result of swinging, shooting is carried out at the press of the release button 2013b.

For this purpose, as described above, the camera system 2001 of the present embodiment is provided with the angular-velocity sensor 2028b in addition to the acceleration sensor 2027b, so that the state of the camera main unit 2001b after being rotated can be instantaneously detected by the angular-velocity sensor 2028b.

When the angular-velocity sensor 2028b is thus provided, it is possible to promptly adjust the position of the camera head 2001a in response to any of tilting and rolling operations as in the case of the panning operation. Accordingly, it is possible for a user to carry out shooting in a quite similar manner in the case of shooting with the camera head 2001a being attached to the camera main unit 2001*b*, only by raising the responsivity level of the motors in the panhead section 2031*a*.

If a user wants to perform shooting when, for example, a subject in a field of view of the user is quite different from that in an image captured by the camera head 2001*a* as described above, in a manner similar to shooting with the camera head 2001*a* being attached to the camera main unit 2001*b*, the user can shift the switch 2029*b* to the Abs side. As a result, the user can perform shooting as if carrying out shooting with the camera head 2001*a* being attached to the camera main unit 2001*b*, by using the display screen of the camera main unit 2001*b* as a finder, without actually looking at the subject through the camera head 2001*a*.

Meanwhile, when a subject in an image captured by the camera head 2001*a* is the approximately same as that in a field of view in the camera main unit 2001*b*, it is possible to carry out shooting while actually looking at the subject. Therefore, in this case, a user can shift the switch 2029*b* to the Inc side and determine a composition by operating the cross key 2039*b*.

Incidentally, a magnetic direction sensor may be provided in place of the angular-velocity sensor 2028*b*.

Figure 18:
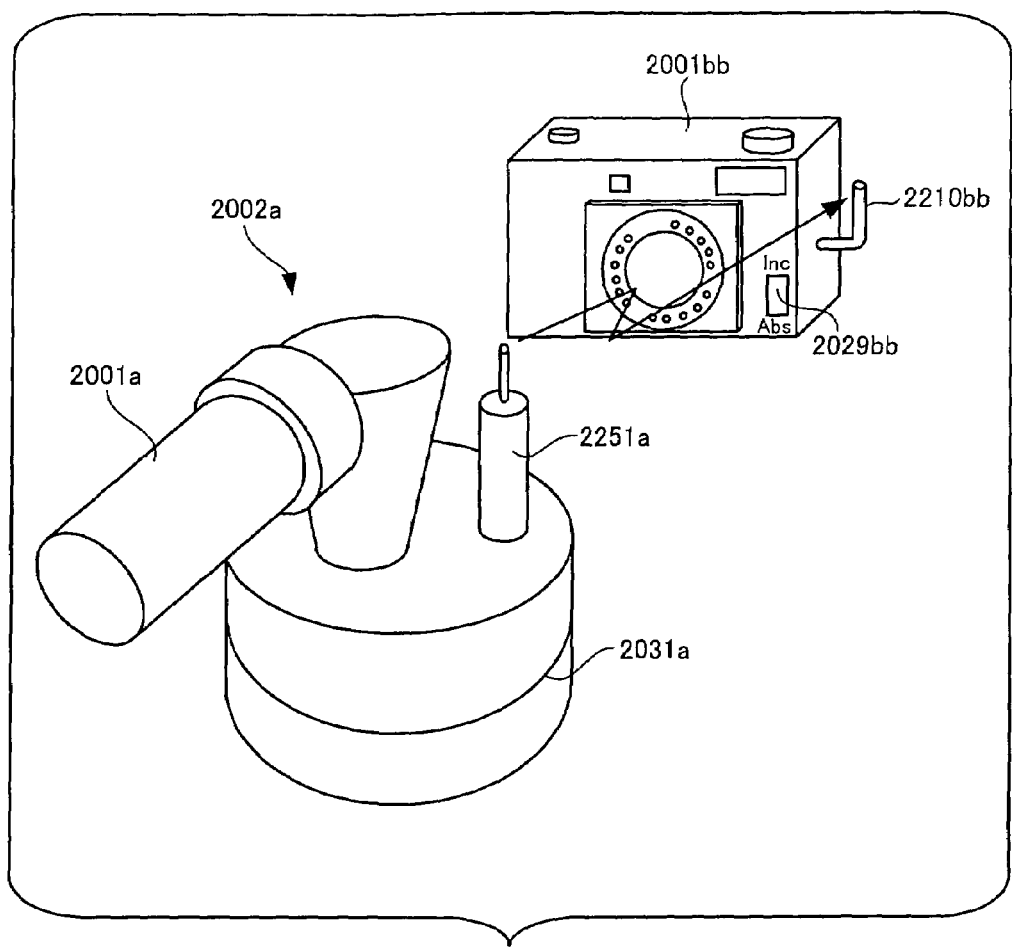
FIG. 18 is a diagram showing another system configuration when the functions of the main-unit adaptor shown in FIG. 16 are incorporated into another camera main unit.
Figure 19:
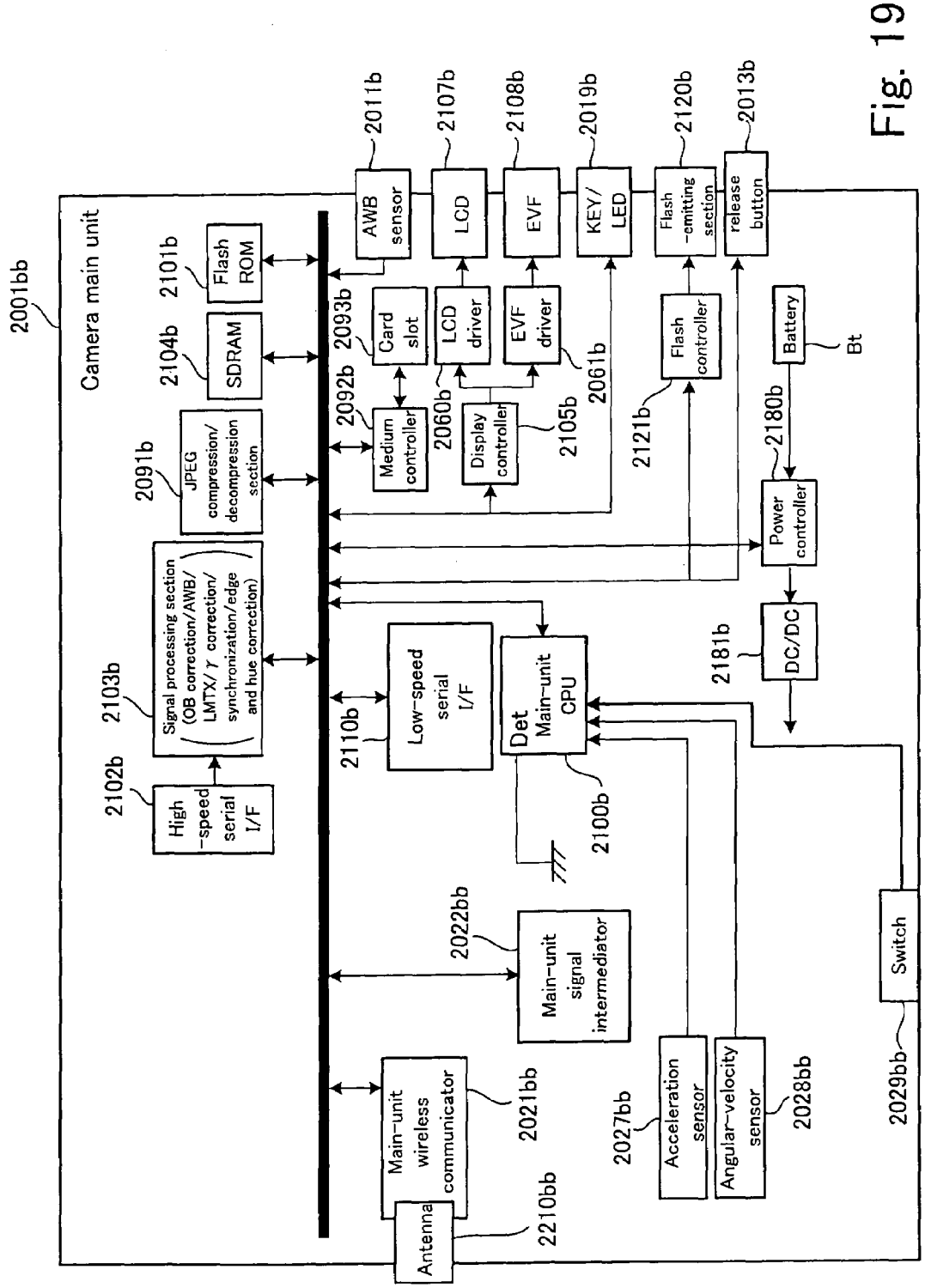
FIG. 19 is a diagram showing an internal configuration of the camera main unit shown in FIG. 18.

FIG. 18 is a diagram showing another system configuration when the functions of the main-unit adaptor 2002*b* shown in FIG. 16 are incorporated into a camera main unit 2001*bb*. FIG. 19 is a diagram showing an internal configuration of the camera main unit 2001*bb*.

As shown in FIG. 19, the functions (corresponding to a main-unit signal intermediator 2022*bb*, a main-unit wireless communicator 2021*bb*, an acceleration sensor 2027*bb* and an angular-velocity sensor 2028*bb* in FIG. 19) of the main-unit adaptor 2002*b* shown in FIG. 16 are disposed inside the camera main unit 2001*bb* so as to eliminate the main-unit adaptor 2002*b* and provide the camera main unit 2001*bb* alone, thereby simplifying the system configuration. This is also acceptable.

As described above, the invention realizes a camera system that allows a user to perform shooting even when the camera head and the camera main unit are separated from each other, as if carrying out shooting with the camera head being attached to the camera main unit.

What is claimed is:

1. A camera system comprising:
   a camera head which includes a shooting lens and an imaging device;
   a camera main unit to which the camera head is detachably attachable and which receives and processes image signals transmitted from the camera head; and
   a head adaptor which includes a panhead section to which the camera head being detached from the camera main unit is detachably attachable instead of being attached to the camera main unit, and a head receiving section that receives an operation signal from the camera main unit,
   wherein the camera main unit includes:
      a position detection section that detects a position of the camera main unit; and
      a main-unit transmission section that transmits an operation signal according to the position detected by the position detection section to the head adaptor,
   wherein the head adaptor flirt her includes a panhead control section that controls a position of the camera head being attached to the panhead section by driving the panhead section based on the operation signal received by the head receiving section,
   wherein the camera main unit further includes a selector switch that switches a way of changing the position of the camera head being attached to the panhead section, between a mode for changing the position of the camera head according to operation through an operation member provided in the camera main unit and a mode for changing the position of the camera head according to the position of the camera main unit,
   wherein the main-unit transmission section transmits switching information related to a status of the selector switch in addition to the operation signal to the head adaptor, and
   wherein the panhead control section drives the panhead section based on the operation signal as well as the switching information.

2. The camera system according to claim 1, wherein the position detection section includes a three-axis acceleration sensor.

3. The camera system according to claim 2, wherein the position detection section further includes, in addition to the three-axis acceleration sensor, either one of a magnetic direction sensor and an angular-velocity sensor.

4. A camera system comprising:
   a camera head which includes a shooting lens and an imaging device;
   a camera main unit to which the camera head is detachably attachable and which receives and processes image signals transmitted from the camera head;
   a head adaptor which includes a panhead section to which the camera head being detached from the camera main unit is detachably attachable instead of being attached to the camera main unit, and a head receiving section that receives an operation signal from the camera main unit; and
   a main-unit adaptor which is detachably attachable to the camera main unit being detached from the camera head instead of being attached to the camera head,
   wherein the main-unit adaptor includes:
      a position detection section that detects a position of the main-unit adaptor; and
      a main-unit transmission section that transmits an operation signal according to the position detected by the position detection section to the head adaptor,
   wherein the head adaptor further includes a panhead control section that controls a position of the camera head being attached to the panhead section by driving the panhead section based on the operation signal received by the head receiving section,
   wherein the main-unit adaptor further includes a selector switch that switches a way of changing the position of the camera head being attached to the panhead section, between a mode for changing the position of the camera head according to operation through an operation member provided in the camera man unit and a mode for changing the position of the camera head according to the position of the camera main unit,
   wherein the main-unit transmission section transmits switching information related to a status of the selector switch in addition to the operation signal to the head adaptor, and wherein the panhead control section drives the panhead section based on t e operation signal as well as the switching information.

5. The camera system according to claim 4, wherein the position detection section includes a three-axis acceleration sensor.

6. The camera system according to claim 5, wherein the position detection section further includes, in addition to the three-axis acceleration sensor, either one of a magnetic direction sensor and an angular-velocity sensor.

* * * * *